(12) United States Patent
Ito

(10) Patent No.: US 11,933,716 B2
(45) Date of Patent: Mar. 19, 2024

(54) FLOW PATH PLATE, ANALYSIS APPARATUS, AND ANALYSIS METHOD

(71) Applicant: ALPS ALPINE CO., LTD., Tokyo (JP)

(72) Inventor: Junko Ito, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 582 days.

(21) Appl. No.: 17/236,265

(22) Filed: Apr. 21, 2021

(65) Prior Publication Data

US 2021/0239601 A1   Aug. 5, 2021

Related U.S. Application Data

(63) Continuation of application No. PCT/JP2019/041521, filed on Oct. 23, 2019.

(30) Foreign Application Priority Data

Oct. 30, 2018   (JP) .................................. 2018-204436

(51) Int. Cl.
*G01N 21/05* (2006.01)
*G01N 21/33* (2006.01)
(Continued)

(52) U.S. Cl.
CPC .............. *G01N 21/05* (2013.01); *G01N 21/33* (2013.01); *G01N 21/85* (2013.01); *G01N 30/74* (2013.01); *G01N 2030/027* (2013.01)

(58) Field of Classification Search
CPC ........ G01N 21/05; G01N 21/33; G01N 21/85; G01N 30/74; G01N 2030/027; G01N 2030/746
See application file for complete search history.

(56) References Cited

U.S. PATENT DOCUMENTS 4,816,695 A *  3/1989  Lavin .................. G01F 23/2921
                                                            250/573
5,269,937 A   12/1993  Dollinger et al.
(Continued)

FOREIGN PATENT DOCUMENTS

JP      H05-505882       8/1993
JP      2006-058093      3/2006
(Continued)

OTHER PUBLICATIONS

International Search Report for PCT/JP2019/041521 dated Jan. 7, 2020.

*Primary Examiner* — Abdullahi Nur
(74) *Attorney, Agent, or Firm* — IPUSA, PLLC

(57) ABSTRACT

A flow path plate for analysis of a component in a liquid sample, flowing within the flow path plate, by irradiating the liquid sample with measurement light is provided. The flow path plate includes a plate body having transparency; a flow path formed within the plate body and through which the liquid sample passes; a chamber provided in a part of the flow path and formed by a space having a cross-sectional area greater than cross-sectional areas of other parts of the flow path; and an internal part for detection disposed in the chamber and having a through hole. The through hole has an inner wall surface and constitutes a part of the flow path. The measurement light passes through the through hole. The internal part is configured to inhibit transmission of the measurement light from the inner wall surface of the through hole to the outside.

13 Claims, 21 Drawing Sheets

(51) Int. Cl.
*G01N 21/85* (2006.01)
*G01N 30/74* (2006.01)
*G01N 30/02* (2006.01)

(56) References Cited

U.S. PATENT DOCUMENTS

| | | | | |
|---|---|---|---|---|
| 5,815,258 | A * | 9/1998 | Nakanishi | G01N 30/74 |
| | | | | 204/603 |
| 6,309,886 | B1 * | 10/2001 | Ambrose | G01N 15/1459 |
| | | | | 436/63 |
| 6,618,144 | B1 * | 9/2003 | Reed | G01N 30/74 |
| | | | | 356/336 |
| 2004/0080744 | A1 * | 4/2004 | Hobbs | G01N 21/05 |
| | | | | 356/246 |
| 2008/0138890 | A1 | 6/2008 | Horiike et al. | |
| 2014/0373606 | A1 | 12/2014 | Kraiczek et al. | |
| 2017/0354971 | A1 | 12/2017 | Taniguchi | |

FOREIGN PATENT DOCUMENTS

| | | |
|---|---|---|
| JP | 2006-275640 | 10/2006 |
| JP | 2017-217617 | 12/2017 |
| WO | 2018/074059 | 4/2018 |

* cited by examiner

FLOW PATH PLATE, ANALYSIS APPARATUS, AND ANALYSIS METHOD

CROSS-REFERENCE TO RELATED APPLICATIONS

This application is a continuation of International Application No. PCT/JP2019/041521, filed on Oct. 23, 2019 and designating the U.S., which claims priority to Japanese Patent Application No. 2018-204436, filed on Oct. 30, 2018. The contents of these applications are incorporated herein by reference in their entirety.

BACKGROUND OF THE INVENTION

1. Field of the Invention

The disclosures herein relate to a flow path plate, an analysis apparatus, and an analysis method.

2. Description of the Related Art

A method for analyzing trace amounts of substances in a liquid (fluid) by using a flow path plate (also referred to as a flow path chip) is known. Examples of the trace amounts of substances include blood components such as proteins and nucleic acids contained in blood and chemicals contained in wastewater discharged from factories.

The flow path plate is configured by stacking a plurality of plates, and a flow path, through which a liquid passes, is formed within the flow path plate by the stacked plates. The flow path plate may be used to analyze components in a liquid by emitting light into the flow path while the liquid is flowing through the flow path of the flow path plate. In general, such a flow path plate requires a small amount of a liquid such as a sample or a reagent for analysis, and thus enables high-accuracy analysis in a short period of time.

For this reason, the flow path plate is expected to be used in a variety of applications, such as clinical testing, food testing, and environmental testing. In recent years, the flow path plate is particularly expected to be used in point-of-care testing (POCT), which is a simple and fast medical test that can be performed at medical and nursing care sites.

As such a flow path plate, a chip flow cell for liquid chromatography including an eluent channel therein is known (see Patent Document 1, for example). The chip flow cell for liquid chromatography includes a first light-transmitting resin layer and a second light-transmitting resin layer, which are outermost layers, and an intermediate layer sandwiched between the first and second light-transmitting resin layers. A through hole is formed through the intermediate layer in the thickness direction of the chip flow cell. While the eluent is passing through the through hole, light is emitted from an ultraviolet light emitting element into the through hole, such that the light passes through the eluent and is received by an ultraviolet light detecting element. In addition, slits are provided on the light incident side of the first light-transmitting resin layer and on the light exit side of the second light-transmitting resin layer so as to condense light.

However, in the chip flow cell for liquid chromatography described in Patent Document 1, if the ultraviolet light detecting element receives stray light, such as light that has leaked from the through hole (leakage light) or light that has diffusely reflected in the through hole (diffuse-reflection light), noise is generated, thereby decreasing measurement accuracy of the ultraviolet light detecting element.

Further, in order to prevent light from striking portions other than the slits, high positioning accuracy is required to provide the slits at the outer surfaces of the first light-transmitting resin layer and the second light-transmitting resin layer. In addition, because the number of parts required for analysis of a liquid increases, the burden related to the installation of a liquid chromatography apparatus equipped with the chip flow cell for liquid chromatography may also increase.

RELATED-ART DOCUMENTS

Patent Documents

Patent Document 1: Japanese Laid-Open Patent Publication No. 2006-275640

SUMMARY OF THE INVENTION

According to at least one embodiment, it is desirable to provide a flow path plate that allows components in a sample to be easily measured with high accuracy by reducing stray light.

According to at least one embodiment, a flow path plate for analysis of a component in a liquid sample, flowing within the flow path plate, by irradiating the liquid sample with measurement light is provided. The flow path plate includes a plate body having transparency; a flow path formed within the plate body and through which the liquid sample passes; a chamber provided in a part of the flow path and formed by a space having a cross-sectional area greater than cross-sectional areas of other parts of the flow path; and an internal part for detection disposed in the chamber and having a through hole. The through hole has an inner wall surface and constitutes a part of the flow path. The measurement light passes through the through hole. The internal part is configured to inhibit transmission of the measurement light from the inner wall surface of the through hole to the outside.

BRIEF DESCRIPTION OF THE DRAWINGS

Other objects and further features of the present invention will be apparent from the following detailed description when read in conjunction with the accompanying drawings, in which.

DESCRIPTION OF THE EMBODIMENTS

Figure 1:
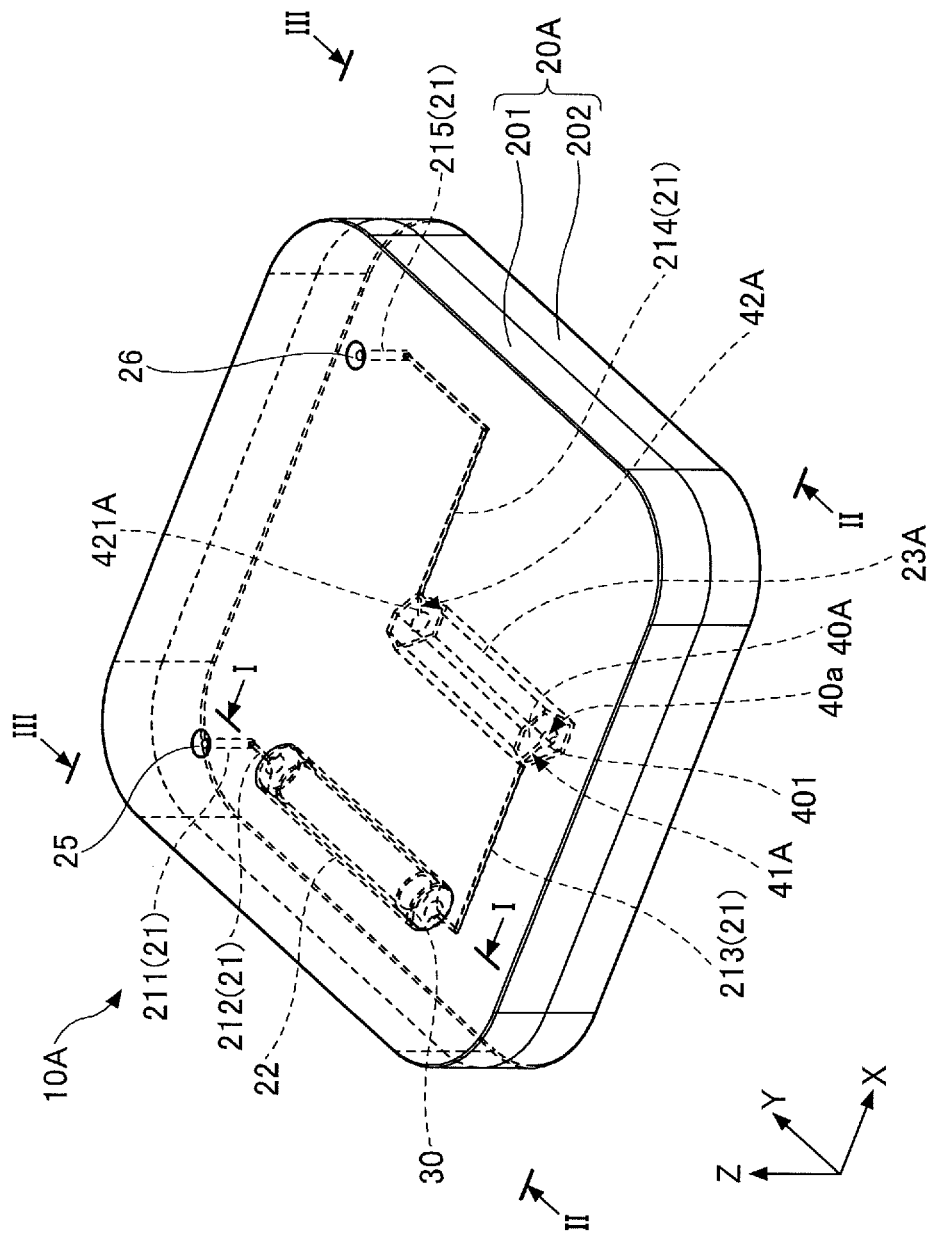
FIG. 1 is a perspective view of a flow path plate according to a first embodiment.

According to at least one embodiment, a flow path plate allows components in a sample to be easily measured with high accuracy by reducing stray light.

In the following, embodiments of the present invention will be described in detail. In order to facilitate understanding of the description, the same elements are denoted by the same reference numerals in the drawings, and a duplicate description thereof will not be provided. In addition, the constituent elements illustrated in the drawings may not be to scale. In this specification, the three-dimensional orthogonal coordinate system using three axes (X-axis direction, Y-axis direction, and Z-axis direction) are used. The width direction of a flow path plate is defined as an X direction, the depth direction of the flow path plate is defined as a Y direction, and the height (thickness direction) of the flow path plate is defined as a Z direction. In the following description, one main surface side in the height direction of the flow path plate is referred to as a top side or an upper side, and the other main surface side in the height direction of the flow path plate is referred to as a bottom side or a lower side. As used herein, the expression "to" indicating a numerical range is meant to include the numerical values given before and after the expression as the lower limit value and the upper limit value, unless otherwise specified.

First Embodiment

<Flow Path Plate>

Figure 2:
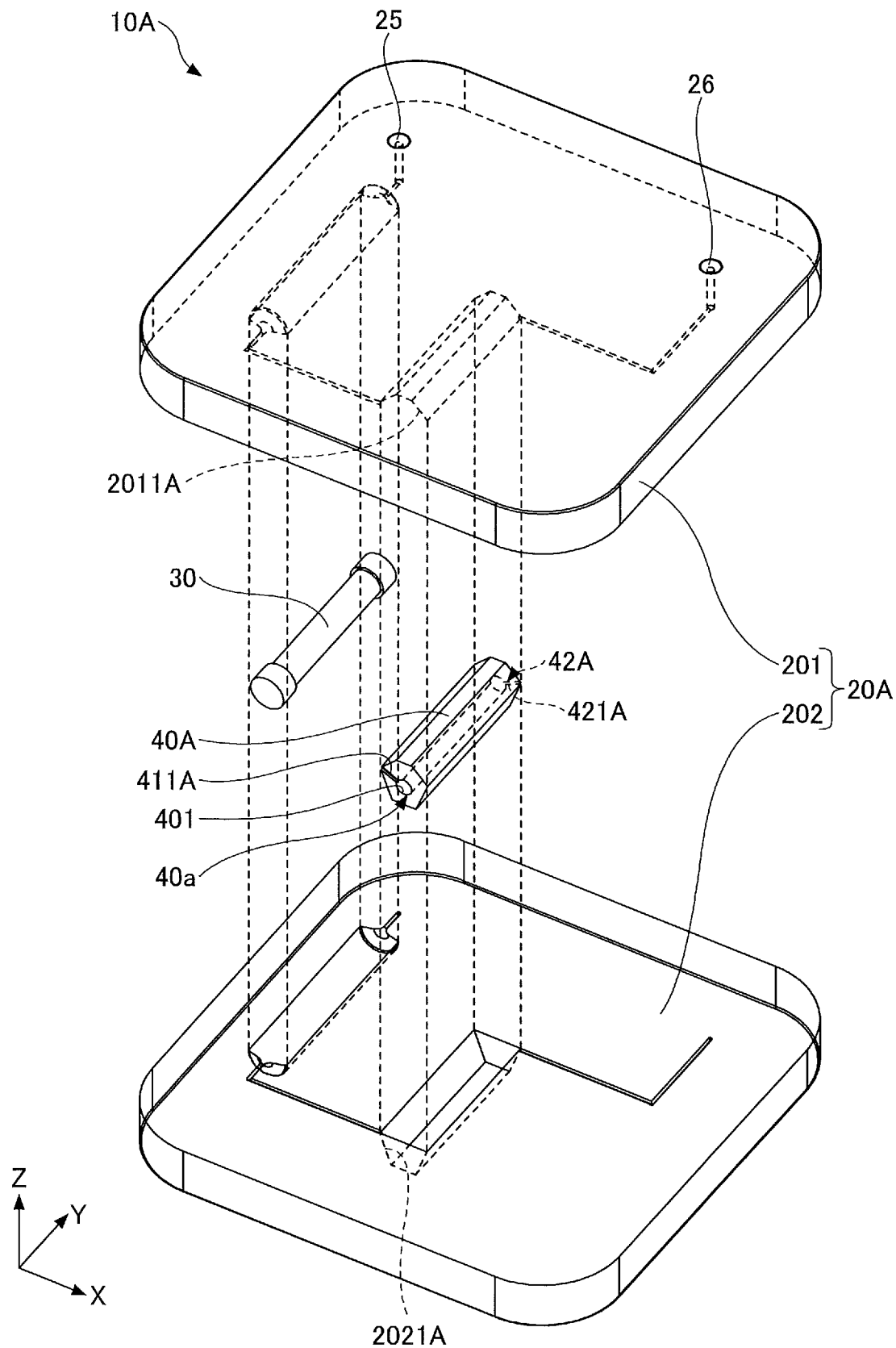
FIG. 2 is an exploded perspective view of the flow path plate.
Figure 3:
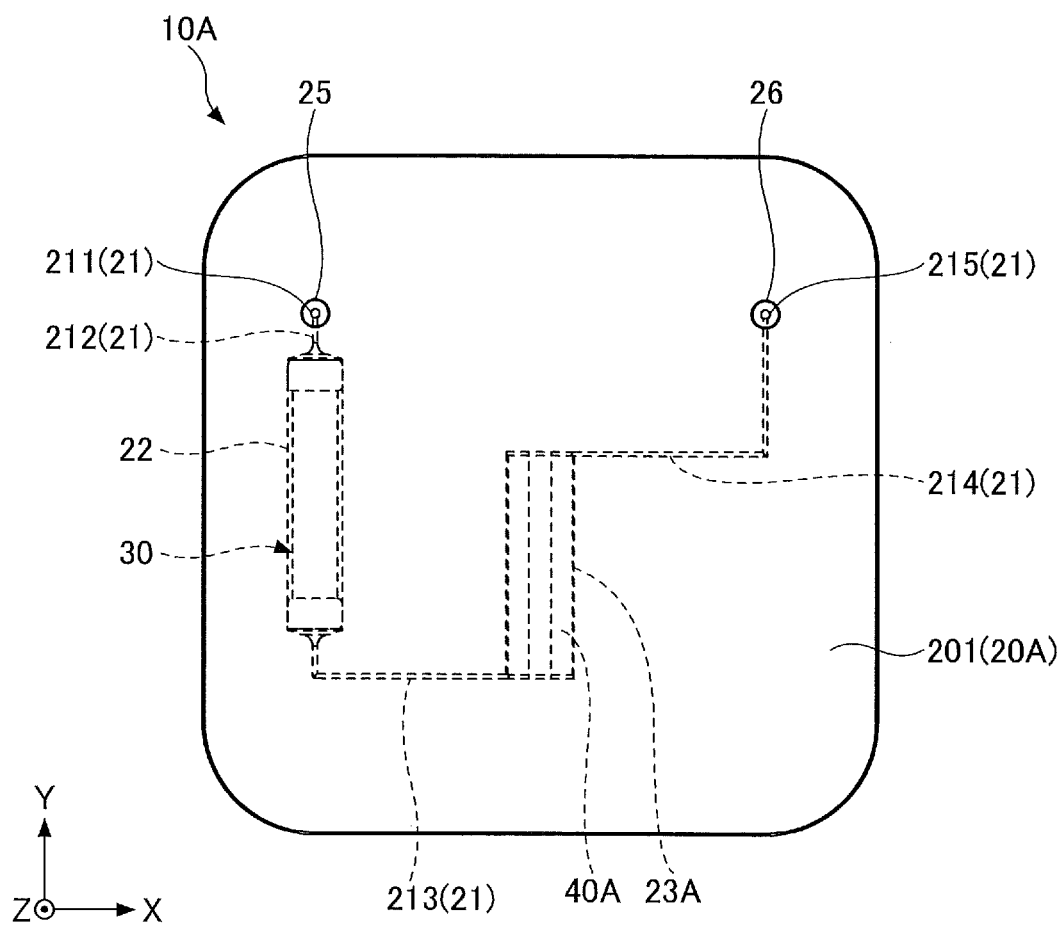
FIG. 3 is a plan view of the flow path plate.

A flow path plate according to a first embodiment will be described. FIG. 1 is a perspective view of the flow path plate according to the first embodiment. FIG. 2 is an exploded perspective view of the flow path plate. FIG. 3 is a plan view of the flow path plate. As illustrated in FIG. 1 through FIG. 3, a flow path plate 10A according to the first embodiment is formed in a rectangular shape in plan view, and is configured to separate components in a liquid to be measured (liquid sample).

Examples of the liquid sample include substances of biological origin (such as blood, sweat, saliva, and urine), drugs, pharmaceuticals, food additives, synthetic chemicals (such as pesticides), and environmentally hazardous substances (such as wastewater from factories, waste liquids, and groundwater). The liquid sample may be hereinafter simply referred to as a sample.

As illustrated in FIG. 1 through FIG. 3, the flow path plate 10A includes a plate body 20A formed in a plate shape, a separation element (separation column 30) that separates components in the sample, and an internal part for detection 40A (internal part 40A). A flow path through which the sample flows is formed within the flow path plate 10A, and the separation column 30 and the internal part 40A are disposed in respective parts of the flow path. In the following, the plate body 20A, the separation column 30, and the internal part 40A of the flow path plate 10A will be described.

(Plate Body)

As illustrated in FIG. 1, the plate body 20A has a plate shape. In plan view, the plate body 20A is formed in a rectangular shape (see FIG. 3), and the corners of the plate body 20A are rounded. Further, the plate body 20A has transparency. Note that having transparency means that measurement light passes through the plate body 20A when the measurement light is emitted to the plate body 20A from the outside of the plate body 20A. Examples of the measurement light include visible light (light with a wavelength of 380 nm to 780 nm), ultraviolet light, and infrared light.

The plate body 20A includes two plates (a first plate 201 and a second plate 202) each having a plate shape. The first plate 201 is stacked on the second plate 202 in the thickness direction of the plate body 20A.

Each of the first plate 201 and the second plate 202 is formed of a material having transparency. Examples of the material having transparency include acrylic-based resins, cycloolefin-based resins, and polyester-based resins. In particular, the material of each of the first plate 201 and the second plate 202 is preferably a cycloolefin-based resin from the viewpoint of ease in manufacturing, the transparency (light with a wide range of wavelengths can be transmitted), and chemical resistance.

The first plate 201 and the second plate 202 may be bonded together by thermocompression bonding, or may be bonded together with an adhesive such as an ultraviolet curing resin.

The plate body 20A has the flow path through which the sample flows. The flow path includes a liquid flow path 21, a separation element chamber 22, and a flow cell 23A (chamber). The liquid flow path 21, the separation element chamber 22, and the flow cell 23A are formed within the flow path plate 10A. The separation element chamber 22 and the flow cell 23 are provided in parallel to each other along the sides of the plate body 20A, and are formed at locations partway along the flow path.

As illustrated in FIG. 2, grooves or holes, having shapes corresponding to the shapes of the liquid flow path 21, the separation element chamber 22, and the flow cell 23A, are formed in the first plate 201 and the second plate 202 that constitute the liquid flow path 21, the separation element chamber 22, and the flow cell 23A. In the present embodiment, the flow cell 23A is formed by a first groove 2011A of the first plate 201 and a second groove 2021A of the second plate 202, as illustrated in FIG. 2.

In the first plate 201 and the second plate 202, grooves forming the liquid flow path 21 and the separation element chamber 22 are horizontally symmetrical with respect to the vertical center lines of the grooves and vertically symmetrical with respect to the bonding surfaces of the first plate 201 and the second plate 202 (mirror-image relationship). The first groove 2011A and the second groove 2021A forming the flow cell 23A are horizontally symmetrical, but are vertically asymmetrical (see FIG. 6). The liquid flow path 21, the separation element chamber 22, and the flow cell 23A are formed by bonding the first plate 201 to the second plate 202. Accordingly, as illustrated in FIG. 1, the flow path is formed within the plate body 20A, and serves as a flow channel through which the sample flows.

The liquid flow path 21, which is the main part of the flow path, is designed to have a bore diameter of a few nanometers to a few hundreds of micromillimeters. In the present embodiment, if the liquid flow path 21 has a circular bore, the bore diameter is the inner diameter of the circular bore, and if the liquid flow path 21 has a square bore, the bore diameter is the length of the diagonal line of the square bore.

As illustrated in FIG. 1, an inlet 25 and an outlet 26 of the liquid flow path 21 are provided on the main surface on the +Z side of the first plate 201. Further, the inlet 25 and the outlet 26 are provided on the +y side of the main surface of the first plate 201 of the flow path plate 10A in plan view. As illustrated in FIG. 3, the inlet 25 and the outlet 26 each has a substantially circular shape.

As illustrated in FIG. 1, the liquid flow path 21 includes a first liquid flow path 211, a second liquid flow path 212, a third liquid flow path 213, a fourth liquid flow path 214, and a fifth liquid flow path 215. That is, in plan view of the flow path plate 10A (see FIG. 3), the liquid flow path 21 has a turnaround structure in which the liquid flow path. 21 extends from the inlet 25 to the outlet 26, with the separation element chamber 22 and the flow cell 23A being interposed therebetween.

The first liquid flow path 211 extends from the inlet 25 substantially vertically in the thickness direction (−Z direction) of the flow path plate 10A, as illustrated in FIG. 1. The first liquid flow path 211 extends from the inlet 25 to the boundary between the first plate 201 and the second plate 202 in the −Z direction, and is connected to the second liquid flow path 212.

As illustrated in FIG. 1, the second liquid flow path 212 connects the first liquid flow path 211 to the separation element chamber 22. In the present embodiment, the second liquid flow path 212 extends from the first liquid flow path 211 along the boundary between the first plate 201 and the second plate 202 in the −Y direction of the flow path plate 10A, and is connected to the separation element chamber 22.

As illustrated in FIG. 1, the third liquid flow path 213 connects the neighboring separation element chamber 22 to the flow cell 23A. In the present embodiment, the third liquid flow path 213 extends from the separation element chamber 22 along the boundary between the first plate 201 and the second plate 202 in the −Y direction, then bends and extends in the +X direction, and is connected to the flow cell 23A.

As illustrated in FIG. 1, the fourth liquid flow path 214 connects the flow cell 23A to the fifth liquid flow path 215. In the present embodiment, the fourth liquid flow path 214 extends from the flow cell 23A along the boundary between the first plate 201 and the second plate 202 in the +X direction, and then bends and extends in the +Y direction of the flow path plate 10A. The fourth liquid flow path 214 extends along the boundary between the first plate 201 and the second plate 202 in the +Y direction, and is connected to the fifth liquid flow path 215.

As illustrated in FIG. 1, the fifth liquid flow path 215 connects the fourth liquid flow path 214 to the outlet 26. The fifth liquid flow path 215 extends from the fourth liquid flow path 214 to the outlet 26 substantially vertically in the thickness direction (+Z direction) of the flow path plate 10A. That is, the fifth liquid flow path 215 extends from the fourth liquid flow path 214 to the outlet 26 in the +Z direction, and is connected to the outlet 26.

The cross sections of the first liquid flow path 211, the second liquid flow path 212, the third liquid flow path 213, the fourth liquid flow path 214, and the fifth liquid flow path 215 have substantially circular shapes as viewed in a direction perpendicular to the flow of a liquid.

The cross sections of the first liquid flow path 211 and the fifth liquid flow path 215 are formed larger than the cross sections of the second liquid flow path 212, the third liquid flow path 213, and the fourth liquid flow path 214. At the time of analysis, a supply tube configured to supply a liquid is inserted into the first liquid flow path 211 from the inlet 25, and a discharge tube configured to discharge the liquid is inserted into the fifth liquid flow path 215 from the outlet 26. For this reason, the cross sections of the first liquid flow path 211 and the fifth liquid flow path 215 are formed larger, such that the supply tube and the discharge tube can be readily inserted into the first liquid flow path 211 and the fifth liquid flow path 215, respectively.

As illustrated in FIG. 3, the inlet 25 and the outlet 26 are provided on the +Y side of the flow path plate 10A in plan view. In addition, the inlet 25 and the outlet 26 are approximately symmetrical with respect to the center line that passes through approximately the center in the X direction of the flow path plate 10A and that is parallel to the sides in the Y direction (namely, the sides perpendicular to the sides in the X direction) of the flow path plate 10A.

As illustrated in FIG. 1, the separation element chamber 22 is a space that houses the separation column 30. The separation element chamber 22 is located in the liquid flow path 21 on the upstream side relative to the flow cell 23A. The separation element chamber 22 is formed in and along the liquid flow path 21 and between the second liquid flow path 212 and the third liquid flow path 213 of the liquid flow path 21. The separation column 30 will be described later in detail.

The flow cell 23A is a space through which light is emitted. As illustrated in FIG. 1, the flow cell 23A is formed between the third liquid flow path 213 and the fourth liquid flow path 214 of the liquid flow path 21, and extends in a direction perpendicular to the third liquid flow path 213 and the fourth liquid flow path 214.

In the present embodiment, as illustrated in FIG. 3, the third liquid flow path 213 is connected to one end on the −Y and −X sides of the flow cell 23A in plan view of the flow path plate 10A. Further, the fourth liquid flow path 214 is connected to the other end on the +Y and +X sides of the flow cell 23A in plan view of the flow path plate 10A.

The flow cell 23A extends in the Y direction of the plate body 20A, and is provided within the plate body 20A across the bonding surfaces of the first plate 201 and the second plate 202. The flow cell 23A is formed by a space having a cross-sectional area greater than cross-sectional areas of the second liquid flow path 212 and of the third liquid flow path 213. The flow cell 23A has a hexagonal shape as viewed in the axial direction (see FIG. 6), and is formed in a rectangular shape in plan view.

As illustrated in FIG. 2, the first groove 2011A of the first plate 201 and the second groove 2021A of the second plate 202, which form the flow cell 23A, are asymmetrical. The flow cell 23A is formed in a shape that allows a through hole 40a (see FIG. 6 through FIG. 8) of the internal part 40A, which will be described later, to be located in the second plate 202 (of the first and second plates 201 and 202) at the time when the internal part 40A is placed in the flow cell 23A. The internal part 40A will be described later in detail.

(Separation Column)

Figure 4:
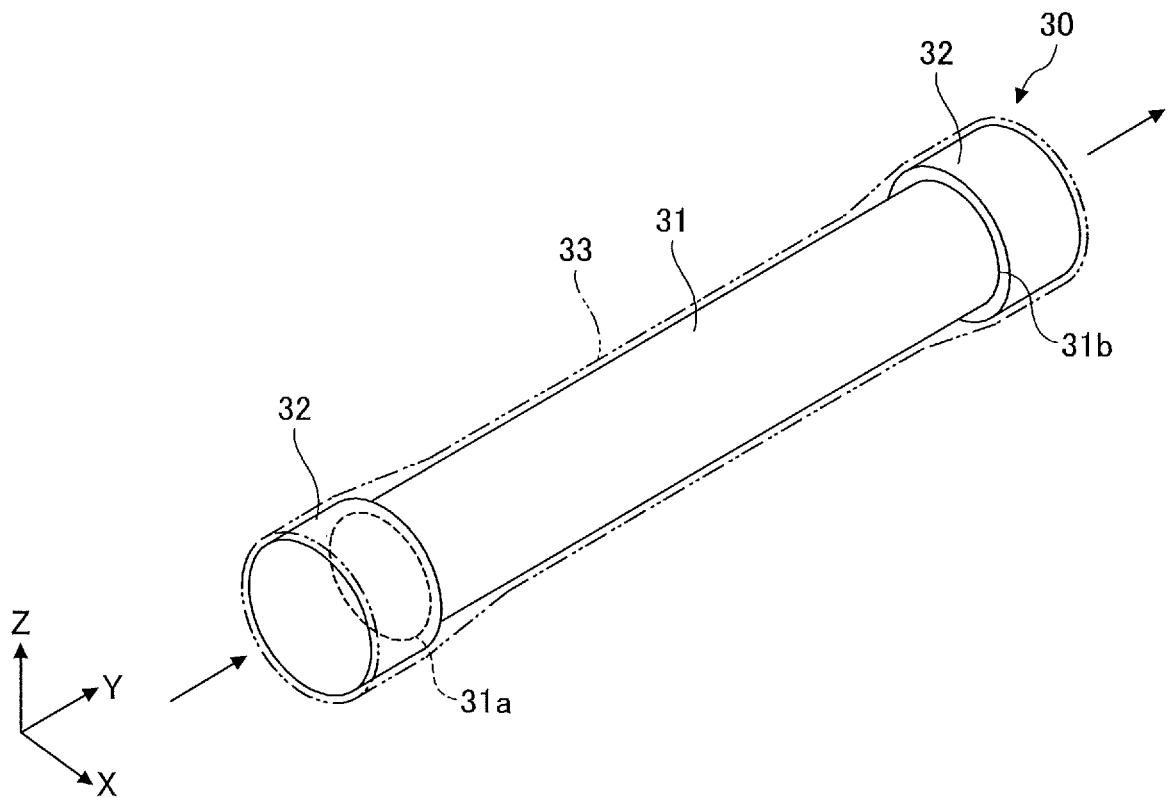
FIG. 4 is a perspective view of an example of a separation column.
Figure 5:
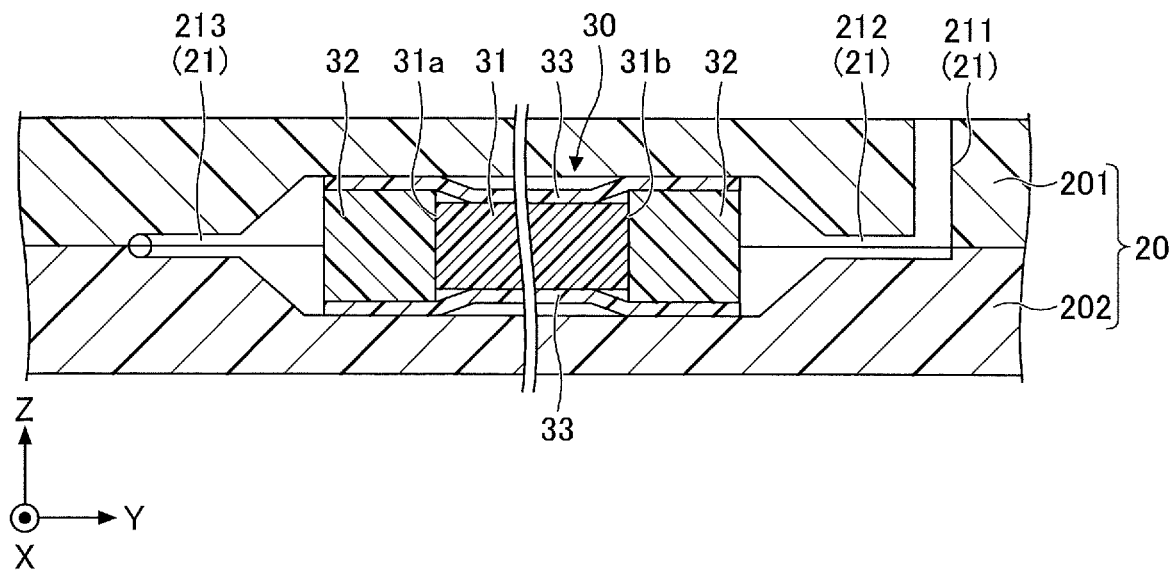
FIG. 5 is an enlarged cross-sectional view of the separation column taken through I-I of FIG. 1.

As illustrated in FIG. 1, the separation column (separation element) 30 is provided within the separation element chamber 22 while being sandwiched between the first plate 201 and the second plate 202. The separation column 30 is configured to separate components in a liquid sample (sample). For example, the separation column 30 may be a separation column for liquid chromatography. An example configuration of the separation column 30 will be described. FIG. 4 is a perspective view of an example of the separation column 30. FIG. 5 is an enlarged cross-sectional view of the separation column 30 taken through I-I of FIG. 1. In FIG. 4, a covering 33 is indicated by a long-dash double-short-dash line for convenience of illustration. As illustrated in FIG. 4 and FIG. 5, the separation column 30 includes a porous stationary phase 31, a pressure regulator 32, and a covering 33. The pressure regulator 32 is provided on each of an inflow end 31a and an outflow end 31b of the stationary phase 31, and the covering 33 covers the stationary phase 31 and the pressure regulator 32.

The stationary phase 31 is formed in a columnar shape. The stationary phase 31 functions to separate components in a sample by interactions (such as hydrophobic interactions or ion exchange) with each of the components passing through the stationary phase 31. The stationary phase 31 is formed of a porous body or aggregates of fine particles. The material of the stationary phase 31 is selected from a variety of ceramics, macromolecules, and the like, depending on the type of liquid and the type of components to be separated. The material of the stationary phase 31 is selected from a variety of ceramics, macromolecules, and the like, in accordance with the type of a sample and the type of a component to be separated. In the present embodiment, examples of the material of the stationary phase 31 include sintered monolithic ceramics. Examples of the sintered ceramics include porous silica. In particular, monolithic silica formed entirely of integral silica gel is preferable.

The pressure regulator 32 is formed in a columnar shape. The outer diameter of the pressure regulator 32 is greater than the outer diameter of the stationary phase 31. The pressure regulator 32 functions to regulate the flow of a sample. The pressure regulator 32 may be formed, for example, of a porous body. Examples of the material of the pressure regulator 32 include known ceramics and polymers. The pressure regulator 32 is disposed at each end of the stationary phase 31 to regulate the flow of a sample into the stationary phase 31 and out of the separation column 30. Accordingly, the turbulence of the flow of the sample into the stationary phase 31 and out of the separation column 30 can be reduced.

The covering 33 is formed in a tubular shape. The covering 33 may be made, for example, of a heat-shrinkable resin that shrinks by heating. The type of the heat-shrinkable resin is not particularly limited. Examples of the heat-shrinkable resin include a tetrafluoroethylene-hexafluoropropylene copolymer (FEP) and polyether ether ketone (PEEK). In particular, it is preferable to use PEEK because gaps are unlikely to form between the stationary phase 31 and the covering 33, and thus the stationary phase 31 can be stably covered.

As described, the columnar-shaped separation column 30 is formed by heating the covering 33, with the stationary phase 31 and the pressure regulator 32 being covered by the covering 33.

The separation column 30 is housed within the separation element chamber 22, while being sandwiched between the first plate 201 and the second plate 202 that constitute the separation element chamber 22. In particular, because the outer diameter of the pressure regulator 32 is greater than the outer diameter of the stationary phase 31, the pressure regulator 32 receives greater pressure from the first plate 201 and the second plate 202 than the stationary phase 31. Therefore, the adhesion between the first and second plates 201 and 202 and the pressure regulator 32 can be increased, and the pressure resistance when a sample is supplied can be thus improved. In addition, the stationary phase 31 can be relieved from being subjected to excessive pressure from the first plate 201 and the second plate 202. Therefore, the pores of the porous stationary phase 31 can be prevented from collapsing, and thus, any obstruction of the flow of the sample through the stationary phase 31 can be avoided. In the present embodiment, the separation column 30 includes the pressure regulator 32. However, the separation column 30 does not necessarily include the pressure regulator 32, and the columnar-shaped separation column 30 may be formed by heating the covering 33, with the stationary phase 31 being covered by the covering 33.

(Internal Part for Detection)

Figure 6:
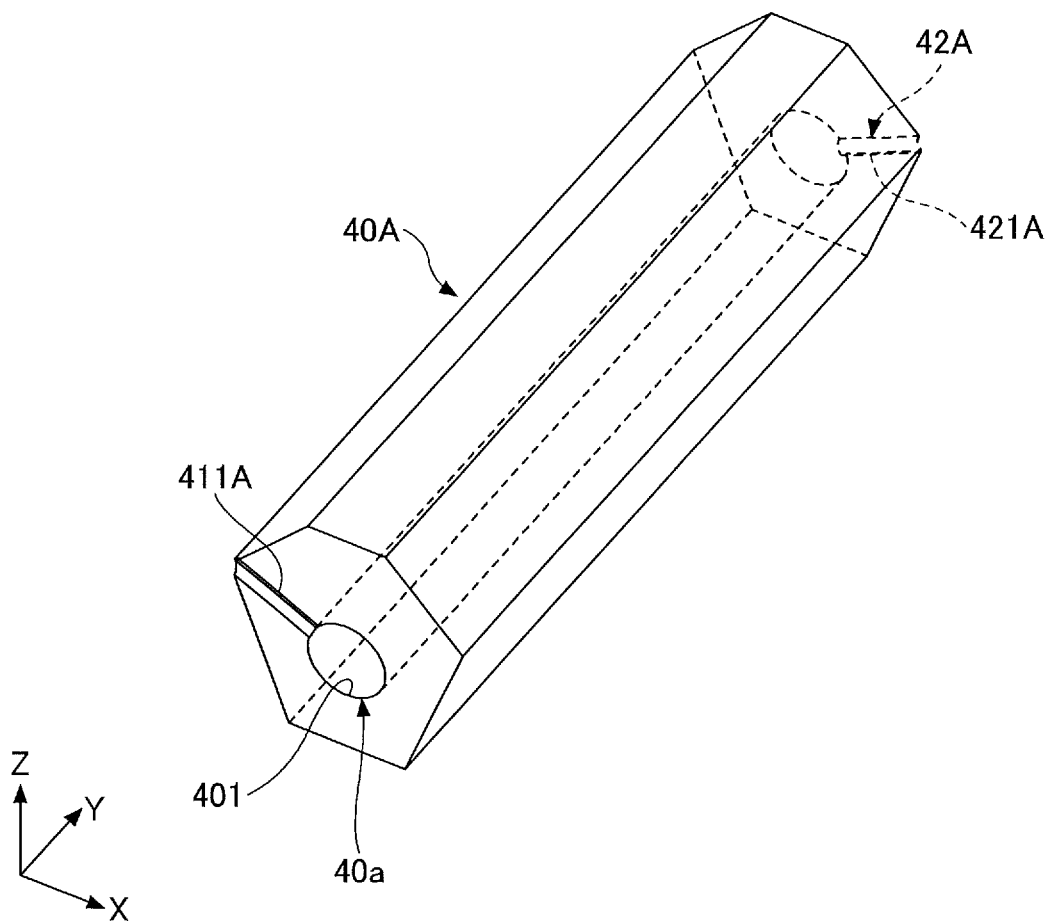
FIG. 6 is a perspective view of an internal part.
Figure 7:
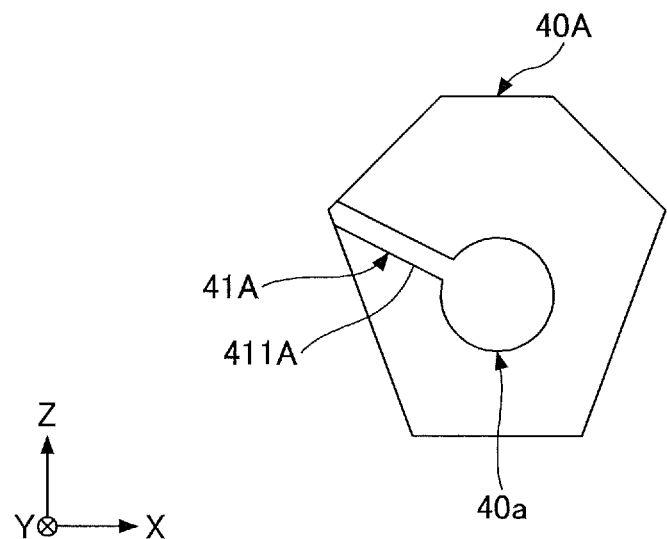
FIG. 7 is a front view of the internal part.
Figure 8:
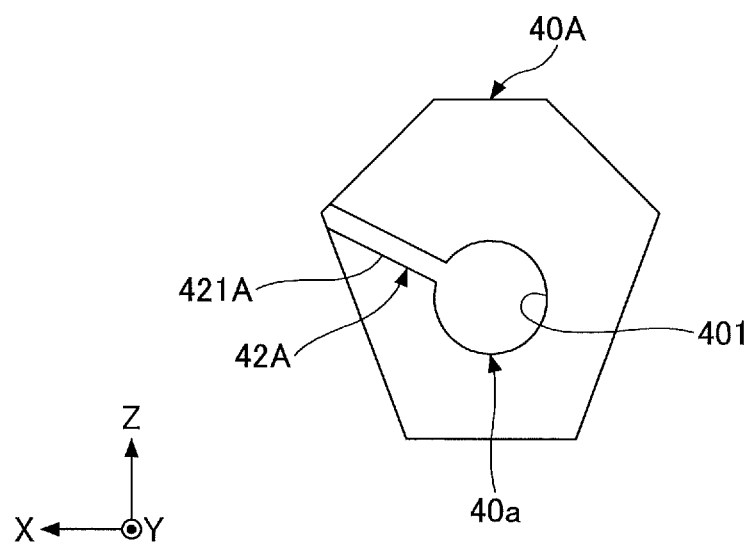
FIG. 8 is a rear view of the internal part.

FIG. 6 is a perspective view of the internal part, FIG. 7 is a front view of the internal part as viewed from the −Y side, and FIG. 8 is a rear view of the internal part as viewed from the +Y side. As illustrated in FIG. 1, the internal part 40A is provided within the flow cell 23A. In the present embodiment, the flow cell 23A has a hexagonal shape as viewed in the axial direction (Y direction). Therefore, as illustrated in FIG. 6 through FIG. 8, the internal part 40A provided within the flow cell 23A also has a hexagonal shape as viewed in the axial direction. The internal part 40A has the through hole 40a extending from one end face (on the −Y side) to the other end face (on the +Y side) of the internal part 40A.

The internal part 40A can be formed of a material that does not allow measurement light used for analysis to pass through the material. Accordingly, the transmission of the measurement light from an inner wall surface 401 of the through hole 40a to the outside can be inhibited. Examples of the measurement light used for analysis include ultraviolet light and visible light. As the material that does not allow the measurement light to pass through the material, one or both of an engineering plastic and a super engineering plastic can be used.

The internal part 40A is obtained by forming a resin material that includes one or both of an engineering plastic and a super engineering plastic as a main component (a base resin).

Examples of the engineering plastic that can be used include nylon 66 (PA66), polyacetal (POM), polypropylene (PP), polybutylene terephthalate (PBT), and Teflon (registered trademark).

Examples of the super engineering plastic that can be used include polyether ether ketone (PEEK), polysulfone (PSF), polyethersulfone (PES), polyphenylene sulfide (PPS), polyetherimide (PEI), polyamideimide (PAI), and a fluoropolymer. As the fluoropolymer, polytetrafluoroethylene (PTFE) or the like may be used. Among the above, PEEK having particularly high mechanical strength and heat resistance is preferably used The above-described engineering plastic and super engineering plastic may be used alone or in combination with each other.

The internal part 40A may further include one or more types of fillers selected from a group consisting of a strengthening agent, a release agent, and an antioxidant as sub-components.

The material of the internal part 40A is appropriately selected in accordance with the wavelength of the measurement light to be used.

The material of the internal part 40A may be colored as long as the measurement light does not pass through the material of the internal part 40A.

Figure 9:
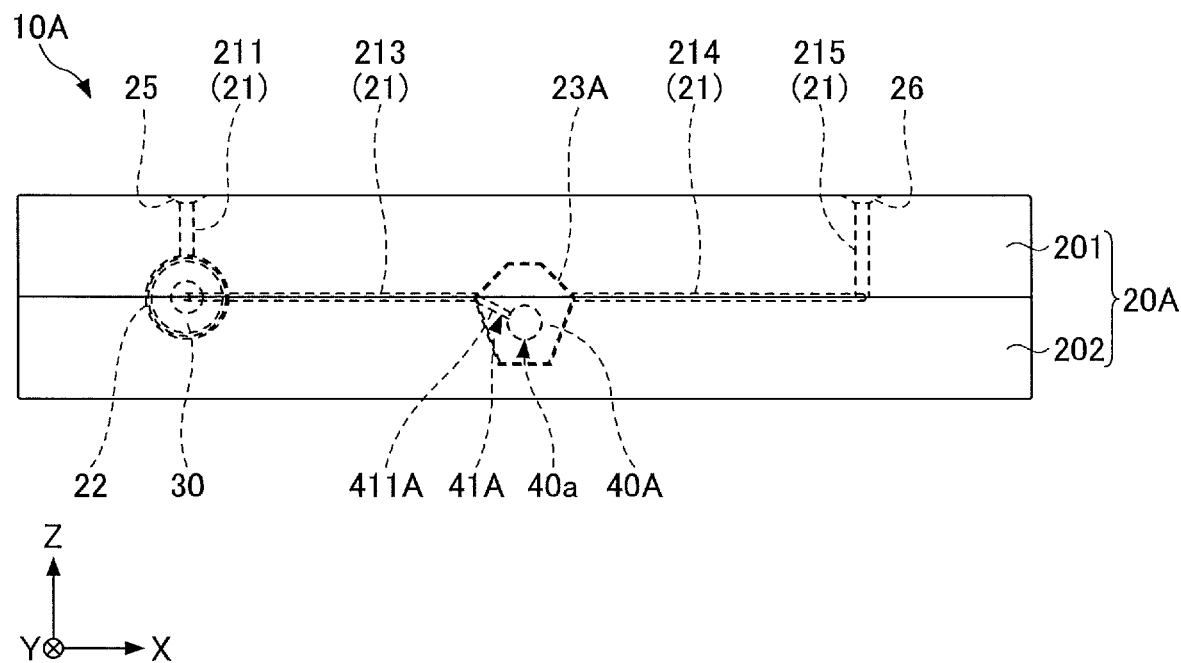
FIG. 9 is a diagram illustrating the internal part taken through II-II of FIG. 1.
Figure 10:
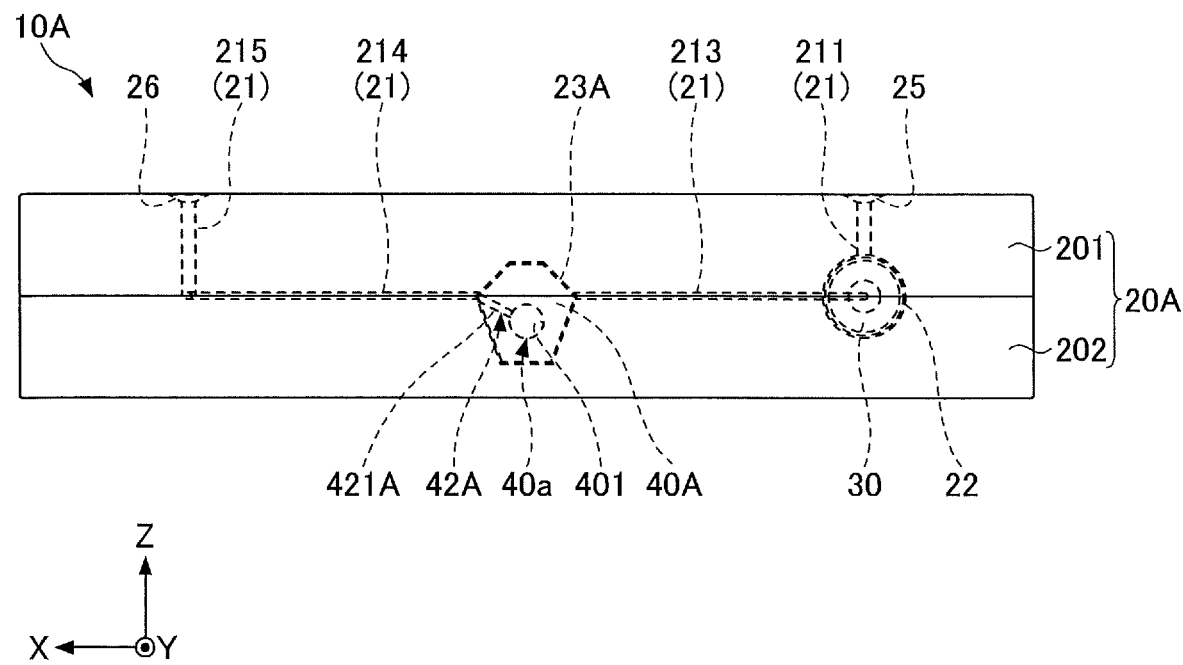
FIG. 10 is a diagram illustrating the internal part taken through of FIG. 1.

The through hole 40a of the internal part 40A is sized to allow the sample and the measurement light to pass through the through hole 40a. FIG. 9 is a diagram illustrating the internal part 40A taken through II-II of FIG. 1. FIG. 10 is a diagram illustrating the internal part 40A taken through of FIG. 1. As illustrated in FIG. 6 through FIG. 10, the through hole 40a of the internal part 40A is formed in a circular shape as viewed in the axial direction. The inner diameter of the internal part 40A can be appropriately set in accordance with the amount of the sample used for analysis and the concentration of a component in the sample. The inner diameter of the internal part 40A can be set by adjusting the thickness of the internal part 40A. Accordingly, various measurement conditions can be set by changing the inner diameter without changing the external shape of the internal part 40A. Therefore, the flow path plate that can correspond to various product specifications can be provided. Note that the through hole 40a does not necessarily have a circular cross-sectional shape, and may have a rectangular cross-sectional shape as long as the through hole 40a is sized to allow the sample and the measurement light to pass through the through hole 40a.

As illustrated in FIG. 9 and FIG. 10, the through hole 40a of the internal part 40A is located in the second plate 202 as viewed in the axial direction. The through hole 40a is formed so as not to cross the bonding surfaces of the first plate 201 and the second plate 202. Thus, the bonding surfaces of the first plate 201 and the second plate 202 do not block the path of the measurement light emitted into the internal part 40A. Accordingly, the flow path plate 10A can contribute to improving the accuracy of measurement.

As illustrated in FIG. 6 through FIG. 9, the internal part 40A has an inflow groove 411A in one end face on the −Y side (third liquid flow path 213 side) of the internal part 40A. The inflow groove 411A forms an inflow path 41A that is connected to the third liquid flow path 213. The third liquid flow path 213 does not overlap the opening of the through hole 40a as viewed in the axial direction (Y direction) of the through hole 40a, and in this state, the sample can be supplied from the third liquid flow path 213 into the through hole 40a. Further, as illustrated in FIG. 6 through FIG. 8 and FIG. 10, the internal part 40A has an outflow groove 421A in the other end face on the +Y side (fourth liquid flow path 214 side) of the internal part 40A. The outflow groove 421A forms an outflow path 42A that is connected to the fourth liquid flow path 214. The fourth liquid flow path 214 does not overlap the opening of the through hole 40a as viewed in the axial direction (Y direction) of the through hole 40a, and in this state, the sample can be supplied from the through hole 40a into the fourth liquid flow path 214.

In the present embodiment, the inflow path 41A connected to one end of the through hole 40a is formed by the inflow groove 411A, which is formed in the one end face of the internal part 40A; however, the present invention is not limited thereto. For example, the inflow path 41A may be formed by a through hole that is formed through a portion on one end face side of the internal part 40A and is connected to one end portion of the through hole 40a. Similarly, the outflow path 42A may be formed by a through hole that is formed through a portion on the other end face side of the internal part 40A and is connected to the other end portion of the through hole 40a.

<Method for Manufacturing Flow Path Plate>

Next, an example of a method for manufacturing the flow path plate 10A according to the present embodiment will be described. First, grooves or holes constituting the liquid flow path 21, the separation element chamber 22, the flow cell 23A, the inlet 25, and the outlet 26 of the flow path plate 10A are formed in the bonding surfaces of two plates having rectangular shapes. In this manner, the first plate 201 and the second plate 202 are obtained. The grooves or holes in the first plate 201 and the second plate 202 may be formed by injection molding or pressing, or may be formed by processing with a laser.

Next, the separation column 30 and the internal part 40A are placed in respective grooves of the second plate 202. The shapes of the grooves, constituting the separation element chamber 22 and the flow cell 23A are larger than other grooves formed in the main surface of the second plate 202. Thus, the separation column 30 and the internal part 40A can be readily placed in the grooves formed in the main surface of the second plate 202, thus facilitating assembly.

Next, the first plate 201 is stacked on the second plate 202 so as not to misalign the first plate 201 and the second plate 202. Then, the first plate 201 and the second plate 202 are bonded together, for example, by thermocompression bonding. As a result, the flow path plate 10A according to the first embodiment as illustrated in FIG. 1 is obtained.

<Analysis Apparatus>

Figure 11:
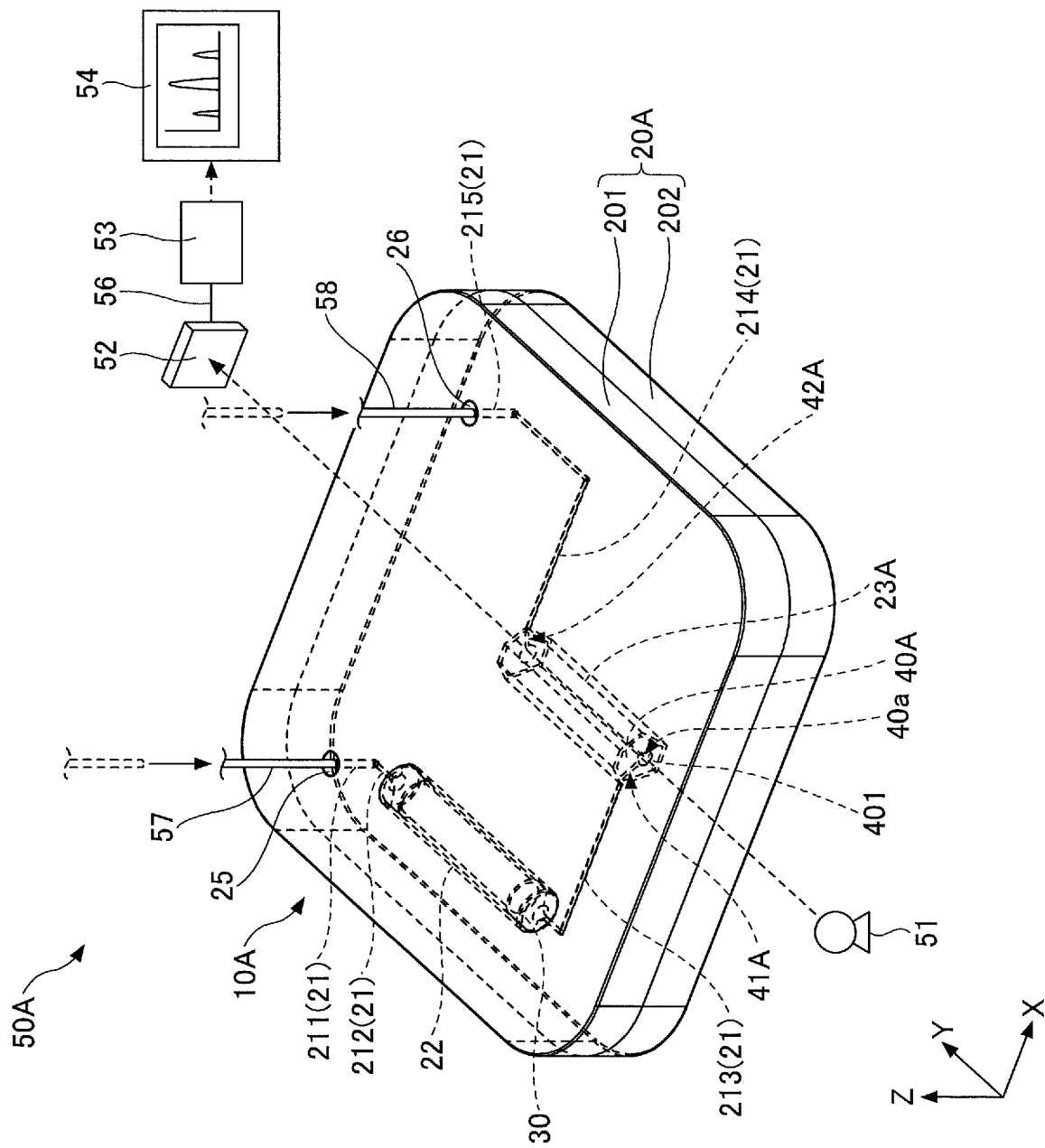
FIG. 11 is a schematic diagram illustrating an analysis apparatus that includes the flow path plate.

Next, an example of an analysis method for analyzing components in a liquid sample (sample) by using an analysis apparatus that includes flow path plate 10A will be described. FIG. 11 is a schematic diagram illustrating an analysis apparatus that includes flow path plate 10A. As illustrated in FIG. 11, an analysis apparatus 50A includes the flow path plate 10A, a light emitter 51, a light receiver 52, a controller 53, and a display 54.

As illustrated in FIG. 11, the light emitter 51 emits measurement light to the internal part 40A of the flow path plate 10A. The light emitter 51 may be, for example, a known light source such as an LED, a tungsten lamp, or a laser.

As illustrated in FIG. 11, after the measurement light is emitted from the light emitter 51, the light receiver 52 receives and detects the measurement light that passed through the through hole 40a of the internal part 40A of the flow path plate 10A. The light receiver 52 is disposed facing the light emitter 51 via the flow cell 23A, such that the optical axis of the light emitter 51 and the optical axis of the light receiver 52 lie approximately on the same straight line.

The light receiver 52 may be a known detector capable of detecting the measurement light. The light receiver 52 is connected to the controller 53 via wiring 56.

The controller 53 analyzes the sample that has passed through the through hole 40a of the internal part 40A of the flow path plate 10A, based on the results of the measurement light detected by the light receiver 52. The controller 53 transmits the analysis results to the display 54.

The display 54 receives the analysis results from the controller 53, and displays the analysis results as illustrated in FIG. 11.

In response to the insertion of the flow path plate 10A into the analysis apparatus 50A, the position of the flow path plate 10A is fixed within the analysis apparatus 50A. Thereafter, as illustrated in FIG. 11, a supply tube 57 configured to supply the sample is automatically inserted into the inlet 25, and a discharge tube 58 configured to discharge the sample is automatically inserted into the outlet 26. The sample is then supplied from the supply tube 57 into the inlet 25.

The sample flows from the inlet 25 to the first liquid flow path 211 in the thickness direction of the flow path plate 10A, and then flows into the separation element chamber 22 through the second liquid flow path 212. While the sample is passing through the separation column 30 disposed in the separation element chamber 22, components of the sample are separated within the separation column 30. Thereafter, the sample, whose components are separated in the separation column 30, flows from the separation element chamber 22 into the flow cell 23A through the third liquid flow path 213.

The sample, supplied into the flow cell 23A, flows through the through hole 40a of the internal part 40A disposed in the flow cell 23A. After passing through the through hole 40a, the sample flows through the fourth liquid flow path 214 and the fifth liquid flow path 215 to the outlet 26. The sample is then discharged from the outlet 26.

While the sample is flowing through the through hole 40a or before the sample flows through the through hole 40a, the light emitter 51 emits the measurement light into the through hole 40a such that the measurement light passes through the through hole 40a. Then, the light emitted from the light emitter 51 passes through the through hole 40a, and is received and detected by the light receiver 52.

The results of the measurement light detected by the light receiver 52 are transmitted to the controller 53 via the wiring 56. The controller 53 analyzes the sample that has passed through the through hole 40a of the internal part 40A of the flow cell 23A. The controller 53 transmits the analysis results to the display 54, and the analysis results are displayed on the display 54.

The internal part 40A of the flow path plate 10A is formed of a material that does not allow measurement light to pass through the material. Therefore, even if the measurement light strikes the inner wall surface 401 of the through hole 40a, this measurement light can be prevented from being transmitted through the internal part 40A to the outside of the internal part 40A as leakage light. In addition, the reflection of the measurement light at the inner wall surface 401 can be suppressed, thereby minimizing the passing of diffuse-reflection light through the through hole 40a. Further, light (external light) having a wavelength close to that of the measurement light does not enter the through hole 40a from the outside of the internal part 40A. Accordingly, the light receiver 52 receives and detects only the measurement light that has passed through the through hole 40a. Further, in the flow path plate 10A, the internal part 40A is fixed within the flow cell 23A. Therefore, the internal part 40A can be readily and accurately placed in the flow path plate 10A. Further, in the flow path plate 10A, the through hole 40a of the internal part 40A is located within the second plate 202, and does not cross the bonding surfaces of the first plate 201 and the second plate 202. If the bonding surfaces of the first plate 201 and the second plate 202 are Irradiated with light, analysis would be adversely affected. For this reason, the optical axis connecting the light emitter 51 and the light receiver 52 of the analysis apparatus 50A do not cross the bonding surfaces.

As described above, the flow path plate 10A according to the present embodiment includes the plate body 20A, the liquid flow path 21, the flow cell 23A, and the internal part 40A, and the internal part 40A is formed of a material such that the measurement light does not readily pass through the inner wall surface 401 of the through hole 40a. In the flow path plate 10A, the sample flows through the through hole 40a of the internal part 40A disposed in the flow cell 23A. While the sample is flowing through the through hole 40a, the light emitter 51 (see FIG. 11) emits the measurement light into the through hole 40a. The measurement light passes through the sample flowing in the through hole 40a, and is received by the light receiver 52 (see FIG. 11) disposed outside the flow path plate 10A. Even if the measurement light strikes the inner wall surface 401 of the through hole 40a, the transmission of the measurement light from the inner wall surface 401 of the internal part 40A can be reduced. Therefore, while the measurement light is passing through the through hole 40a of the internal part 40A, the measurement light can be prevented from leaking to the outside through the inner wall surface 401 of the through hole 40a as leakage light. Further, as described above, diffuse-reflection light and external light can be prevented from passing through the inner wall surface 401. Accordingly, stray light such as leakage light, diffuse-reflection light, and external light can be prevented from being detected as noise by the light receiver 52 disposed outside the flow path plate 10A. Thus, the flow path plate 10A can measure the components in the liquid sample (sample) with high accuracy by reducing stray light.

The flow path plate 10A can cause the internal part 40A to function as a slit for extracting measurement light that has passed through the through hole 40a without striking the end face of the internal part 40A. That is, the flow path plate 10A can extract measurement light that has passed through the through hole 40a without striking the end face of the internal part 40A. In addition, the diameter of light emitted into the internal part 40A can be adjusted to the diameter of the through hole 40a by adjusting the diameter of the through hole 40a. Accordingly, in the flow path plate 10A in which the internal part 40A functions as the slit, the irradiation position of measurement light is not required to be adjusted with high accuracy. Thus, components in a sample flowing in the through hole 40a of the internal part 40A can be easily and stably measured by the analysis apparatus 50A (see FIG. 11).

The plate body 20A of the flow path plate 10A is configured by the two plates (the first plate 201 and the second plate 202). Therefore, the positions of the first plate 201 and the second plate 202 can be readily aligned. That is, when the first plate 201 and the second plate 202 of the flow path plate 10A are bonded together, the internal part 40A can be simply fitted into the flow cell 23A, and the first plate 201 and the second plate 202 can be aligned with the internal part 40A being the center. In this manner, misalignment of the bonding surfaces of the first plate 201 and the second plate 202 can be reduced. In addition, by minimizing the misalignment of the bonding surfaces, deformation of the shape of the through hole 40a in cross-sectional view due to partial displacement of the bonding surfaces or due to deformation in the shape of the bonding surfaces can be prevented. Further, in the flow path plate 10A, the separation column 30 is also fitted into the separation element chamber 22, and the first plate 201 and the second plate 202 are aligned with the separation column 30 being the center. Therefore, misalignment of the bonding surfaces of the first plate 201 and the second plate 202 can be further reduced.

Further, in the flow path plate 10A, the flow rate of a sample flowing in the internal part 40A can be adjusted by adjusting the inner diameter of the through hole 40a of the internal part 40A. For example, if the amount of a sample to be measured is large or the concentration of a component in the sample is high, the inner diameter of the through hole 40a of the internal part 40A is increased so as to supply a large amount of the sample. Conversely, if the amount of a sample to be measured is small or the concentration of a component in the sample is low, the inner diameter of the through hole 40a of the internal part 40A is decreased so as to supply a small amount of the sample. Accordingly, in the flow path plate 10A, the flow rate of a sample flowing in the internal part 40A can be adjusted by changing the inner diameter of the through hole 40a in accordance with the amount of the sample or the concentration of a component in the sample, thus allowing the component in the sample to be stably analyzed.

The flow path plate 10A can be suitably used for various types of samples by changing the material of the internal part 40A, the inner diameter of the through hole 40a, or the like. In other words, the flow path plate 10A can be applied to various types of samples.

The flow path plate 10A can prevent measurement light from passing through the internal part 40A. Accordingly, each of the first plate 201 and the second plate 202 is not required to be formed of a material that corresponds to the wavelength of the measurement light, and may be formed of any transparent material. Thus, the material of each of the first plate 201 and the second plate 202 is not particularly limited.

In the flow path plate 10A, the internal part 40A includes the inflow path 41A connected to one end of the through hole 40a, and also includes the outflow path 42A connected to the other end of the through hole 40a. With this configuration, a sample flowing from the liquid flow path 21 (third liquid flow path 213) can enter the through hole 40a through the inflow groove 411A (inflow path 41A) along the inner wall surface 401. In addition, the sample can flow into the liquid flow path 21 (fourth liquid flow path 214) from the through hole 40a through the outflow groove 421A (outflow path 42A) along the inner wall surface 401. That is, the sample would not enter into the opening in the one end (on the −Y side) of the through hole 40a through a part of the liquid flow path 21 extending from the third liquid flow path 213. Further, the sample would not flow out of the opening in the other end (on the +Y side) of the through hole 40a into the fourth liquid flow path 214 through a part of the liquid flow path 21. As viewed from the irradiation side of measurement light, the liquid flow path 21 is not present at the both ends of the through hole 40a. Accordingly, the flow path plate 10A can prevent the liquid flow path 21 from blocking the path of the measurement light emitted into the internal part 40A.

In the flow path plate 10A, as a material that does not allow measurement light to pass through the material, the internal part 40A is formed of one or both of an engineering plastic and a super engineering plastic. Accordingly, in the flow path plate 10A, the material of the internal part 40A that does not allow measurement light to pass through the material can be appropriately selected in accordance with the wavelength of the measurement light. Further, engineering plastics and super engineering plastics have excellent solvent resistance, heat resistance, pressure resistance, and the like, and thus can be stably used for various inspection samples.

The flow path plate 10A is configured by the two plates (the first plate 201 and the second plate 202), and the first plate 201 and the second plate 202 have the grooves corresponding to the first through fifth liquid flow paths of the liquid flow path 21. Accordingly, the plate body 20A having the liquid flow path 21 can be readily obtained by bonding the first plate 201 and the second plate 202 together. In addition, if the first plate 201 and the second plate 202 are formed by injection molding, a mold can also be readily manufactured.

In the flow path plate 10A, the flow cell 23A is formed such that the axial direction of the through hole 40a is parallel to one of the main surfaces of the plate body 20A. The internal part 40A is disposed within the flow cell 23A such that the axial direction of the through hole 40a is parallel to the one of the main surfaces of the plate body 20A. Accordingly, the flow direction of a sample to be analyzed can be set to the plane direction (Y direction) of the flow path plate 10A. For example, if the optical path of the analysis apparatus is in the horizontal direction, the flow direction of a sample can be set to the horizontal direction.

In the flow path plate 10A, the flow cell 23A is formed by the first groove 2011A (see FIG. 2) and the second groove 2021A (see FIG. 2). The first groove 2011A is one of the grooves of the first plate 201, and the second groove 2021A is one of the grooves of the second plate 202. The flow cell 23A has a polygonal shape (in the present embodiment, a hexagonal shape) as viewed in the axial direction (Y direction). The internal part 40A is formed in a polygonal cross-sectional shape (in the present embodiment, a hexagonal cross-sectional shape) as viewed in the axial direction of the through hole 40a, and is placed in the flow cell 23A. The shape of the internal part 40A can be adjusted to correspond to the shape of the flow cell 23A by forming the internal part 40A in the same polygonal shape as the flow cell 23A as viewed in the axial direction. Thus, the positional displacement of the internal part 40A in the flow cell 23A can be easily prevented. Accordingly, the striking of measurement light on the inner wall surface 401 of the internal part 40A due to the positional displacement of the internal part 40A can be reduced, thus allowing components in a sample to be stably measured.

In the flow path plate 10A, the flow cell 23A is formed by the first groove 2011A (see FIG. 2) and the second groove 2021A (see FIG. 2). The first groove 2011A is one of the grooves of the first plate 201 and the second groove 2021A (see FIG. 2) is one of the grooves the second plate 202. The cross-sectional shape of the first groove 2011A (see FIG. 2) as viewed in the axial direction and the cross-sectional shape of the second groove 2021A (see FIG. 2) as viewed in the axial direction are asymmetrical. In addition, the through hole 40a of the internal part 40A disposed in the flow cell 23A is located in the second groove 2021A (see FIG. 2). Therefore, the optical axis along which measurement light passes through the internal part 40A is not in the bonding surfaces (boundary) of the first plate 201 and the second plate 202. Accordingly, any scattering of the measurement light at the bonding surfaces can be reduced, thereby allowing detection error of the internal part 40A to be minimized.

In the flow path plate 10A, the internal part 40A includes the inflow path 41A that connects the one end of the through hole 40a to the liquid flow path 21 formed within the plate body 20A, and the outflow path 42A that connects the other end of the through hole 40a to the liquid flow path 21 formed within the plate body 20A. Accordingly, the inflow path 41A and the outflow path 42A can be formed by the internal part 40A and the first plate 201 or the second plate 202 (in the present embodiment, the second plate 202), in addition to the liquid flow path 21 formed by the first plate 201 and the second plate 202. In this manner, in the flow path plate 10A, the entire flow path including the liquid flow path 21, the through hole 40a, the inflow path 41A, and the outflow path 42A can be formed in the plate body 20A configured by the two plates (the first plate 201 and the second plate 202). Accordingly, the plate body 20A of the flow path plate 10A can be configured by a small number of plates.

The flow path plate 10A includes the separation element chamber 22 that is located in the liquid flow path 21 on the upstream side relative to the flow cell 23A through which measurement light passes, and the separation column 30 is disposed in the separation element chamber 22. Accordingly, after components in a sample are separated in the separation column 30, the components in the sample can be analyzed in the internal part 40A.

As described above, in the flow path plate 10A of the present embodiment, trace amounts of substances, such as blood components such as proteins and nucleic acids contained in blood, chemicals contained in wastewater discharged from factories, and components contained in groundwater can be easily and accurately analyzed. Therefore, the flow path plate 10A can be suitably used in clinical testing, food testing, and environmental testing, and also at medical and nursing care sites. In particular, the flow path plate 10A can be effectively used in POCT.

(Modifications)

In the present embodiment, the plate body 20A has a rectangular shape in plan view; however, the plate body 20A may have a circular shape or any other shape.

In the present embodiment, the plate body 20A is configured by the two plates (the first plate 201 and the second plate 202); however, the plate body 20A may be configured by three or more plates.

In the present embodiment, each of the first liquid flow path 211, the second liquid flow path 212, the third liquid flow path 213, the fourth liquid flow path 214, and the fifth liquid flow path 215 has a substantially circular cross-sectional shape; however, any of the first liquid flow path 211, the second liquid flow path 212, the third liquid flow path 213, the fourth liquid flow path 214, and the fifth liquid flow path 215 may have a polygonal cross-sectional shape.

Figure 12:
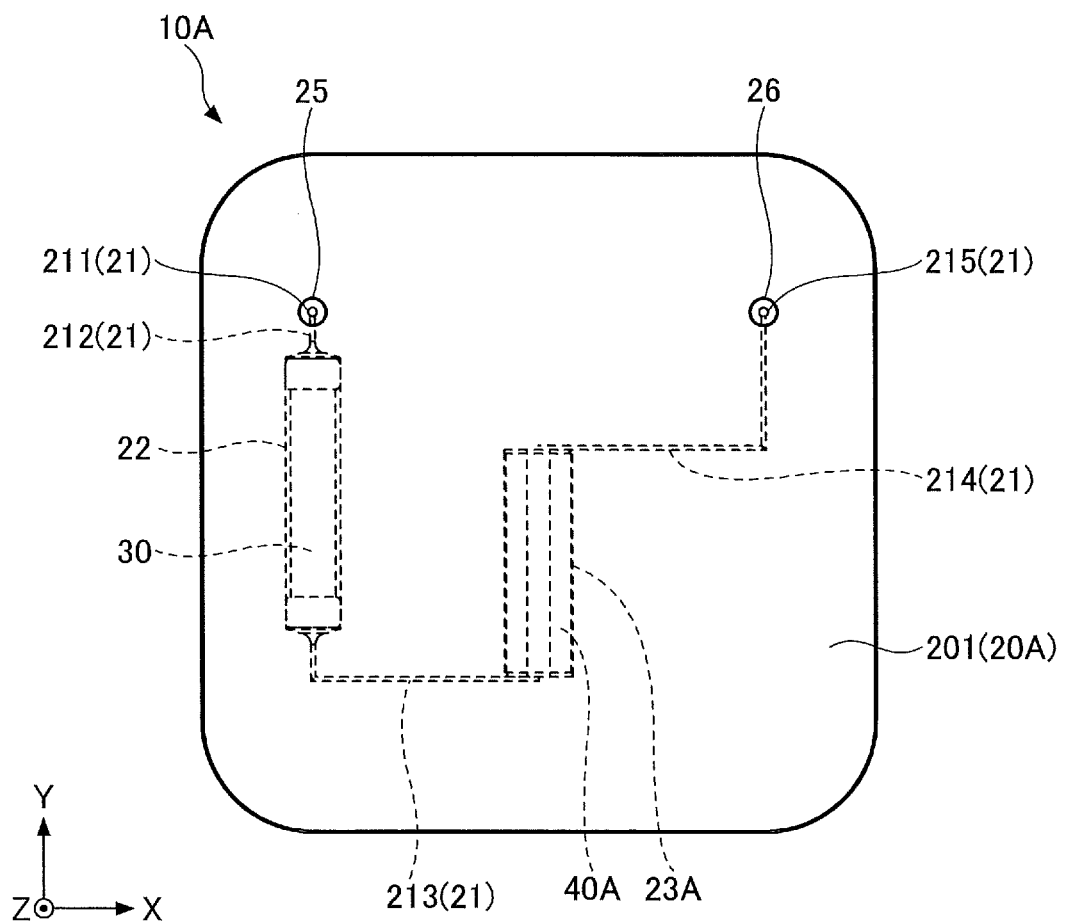
FIG. 12 is a plan view illustrating another example configuration in which a liquid flow path is connected to an internal part.

In the present embodiment, the liquid flow path 21 is connected to the inflow path 41A and the outflow path 42A formed in the end faces of the internal part 40A; however, the present invention is not limited thereto. FIG. 12 is a plan view illustrating another example configuration in which the liquid flow path 21 is connected to an internal part 40A. As illustrated in FIG. 12, the liquid flow path 21 (the third liquid flow path 213 and the fourth liquid flow path 214) may extend to the openings of the through hole 40a of the internal part 40A.

In the present embodiment, a plurality of separation element chambers 22 may be provided in series or in parallel in the flow path plate 10A to the extent that the shape and size of the flow path plate 10A are not affected. In such a case, separation columns 30 may be provided in the respective separation element chambers 22.

In the present embodiment, the cross-sectional shape in the axial direction of the flow cell 23A may be a shape that allows the through hole 40a of the internal part 40A to be located in the first plate 201.

Figure 13:
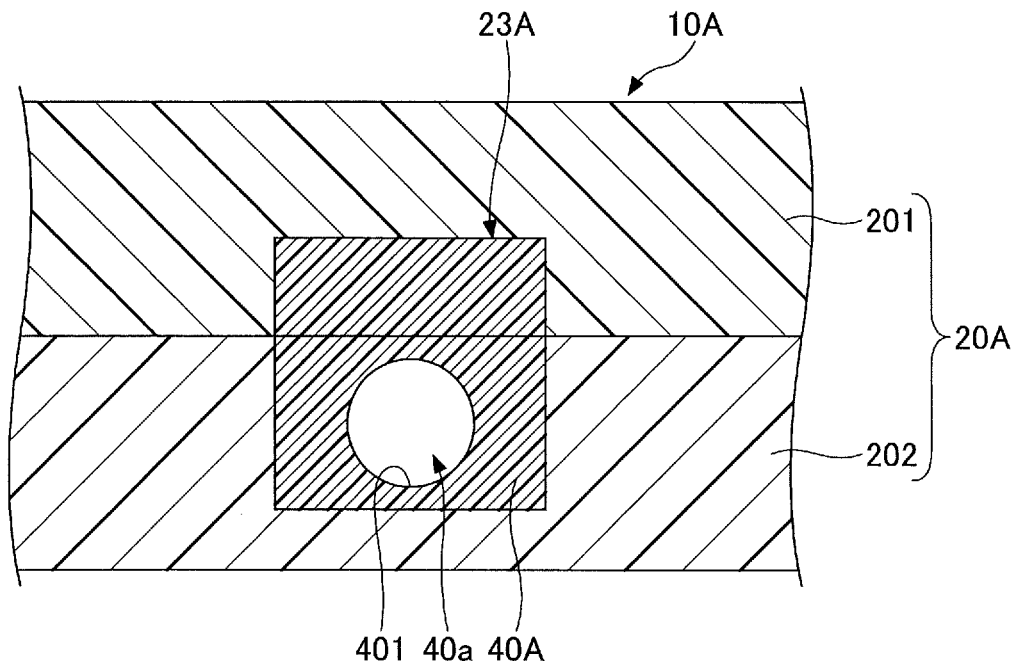
FIG. 13 is a partial cross-sectional view of an example of a flow cell having another shape as viewed in the axial direction.
Figure 14:
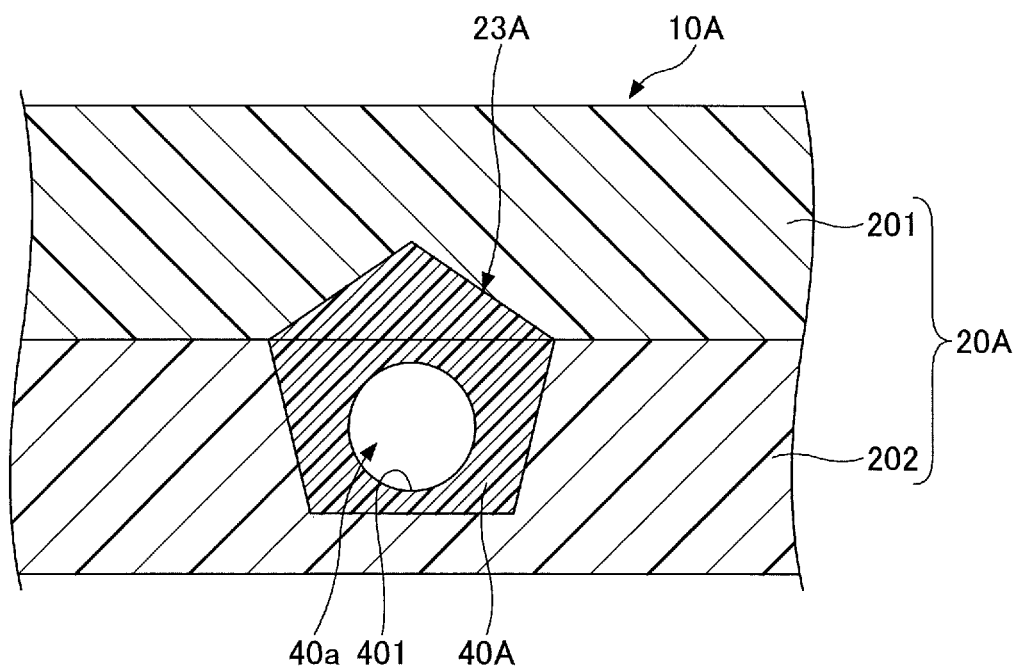
FIG. 14 is a partial cross-sectional view of an example of a flow cell having another shape as viewed in the axial direction.

In the present embodiment, the cross-sectional shape in the axial direction of the flow cell 23A may be a polygonal shape such as a square shape as illustrated in FIG. 13 or a pentagonal shape as illustrated in FIG. 14. In such a case, the internal part 40A is formed in a polygonal cross-sectional shape, such as a pentagonal cross-sectional shape, such that the cross-sectional shape in the axial direction of the internal part 40A corresponds to the cross-sectional shape in the axial direction of the flow cell 23A. By forming the internal part 40A in a polygonal shape as viewed in the axial direction, such that the cross-sectional shape of the internal part 40A corresponds to the cross-sectional shape of the flow cell 23A, the positional displacement of the internal part 40A in the flow cell 23A can be prevented. Accordingly, the striking of measurement light on the inner wall surface 401 of the internal part 40A due to the positional displacement of the internal part 40A can be reduced, thus allowing components in a sample to be stably measured.

Note that, if the flow cell 23A has a circular cross-sectional shape as viewed in the axial direction, and the through hole 40a is located in either the first plate 201 or the second plate 202, it would be difficult to place/remove the internal part 40A in/from the flow cell 23A. For this reason, in the present embodiment, the flow cell 23A preferably has a polygonal cross-sectional shape as viewed in the axial direction, and the cross-sectional shape of the flow cell 23A is preferably not tapered toward the bonding surfaces of the first plate 201 and the second plate 202. In this manner, the first plate 201 or the second plate 202 (in the present embodiment, the second plate 202) in which the through hole 40a is located, can be readily formed by injection molding or pressing, thus allowing the plate body 20A to be readily produced.

In the present embodiment, the length of the flow cell 23A is not particularly limited, and the flow cell 23A may be designed to have any length. For example, the length of the flow cell 23A may be greater than or equal to half the length in the Y direction of the flow path plate 10A. The flow path plate 10A can include the flow cell 23A at any position without changing the thickness of the flow path plate 10A. Thus, even if the flow cell 23A of the flow path plate 10A is made longer than that illustrated in FIG. 1 through FIG. 3, the shape of the flow path plate 10A can remain the same as that illustrated in FIG. 1 through FIG. 3, and thus can be used as illustrated in FIG. 1 through FIG. 3.

In the present embodiment, the length of the separation column 30 is not particularly limited, and the separation column 30 may have any length.

In the present embodiment, the separation column 30 includes the covering 33. However, the separation column 30 does not necessarily include the covering 33 as long as the separation column 30 can be disposed in the separation element chamber 22 while being sandwiched between the first plate 201 and the second plate 202.

In the present embodiment, the internal part 40A is formed in a hexagonal shape as viewed in the axial direction so as to correspond to the shape of the flow cell 23A. However, the internal part 40A may have any shape that corresponds to the shape of the flow cell 23A as viewed in the axial direction. If the cross-sectional shape in the axial direction of the flow cell 23A is a polygonal shape such as a square shape as illustrated in FIG. 13 or a hexagonal shape as illustrated in FIG. 14, the internal part 40A is formed in a polygonal shape such as a square shape or a pentagonal shape as viewed in the axial direction.

In the present embodiment, the internal part 40A may include two layers, namely, an inner tube and an outer tube as viewed in the axial direction. In this case, the inner tube or the outer tube is formed of a material that does not allow measurement light used for analysis to pass through the material. If the inner tube is formed of a material that does not allow measurement light used for analysis to pass through the material, the transmission of the measurement light from the inner peripheral surface 401 (inner peripheral surface of the inner tube) can be inhibited when the measurement light is emitted into the through hole 40a of the internal part 40A (into the inner tube). If the outer tube is formed of a material that does not allow measurement light used for analysis to pass through the material, the transmission of the measurement light from the inner peripheral surface of the outer tube can be inhibited even if the measurement light is transmitted through the inner peripheral surface 401 (inner peripheral surface of the inner tube).

In the present embodiment, the through hole 40a of the internal part 40A may be formed in a polygonal shape, such as a square shape or a pentagonal shape, instead of a circular shape as viewed in the axial direction.

Figure 15:
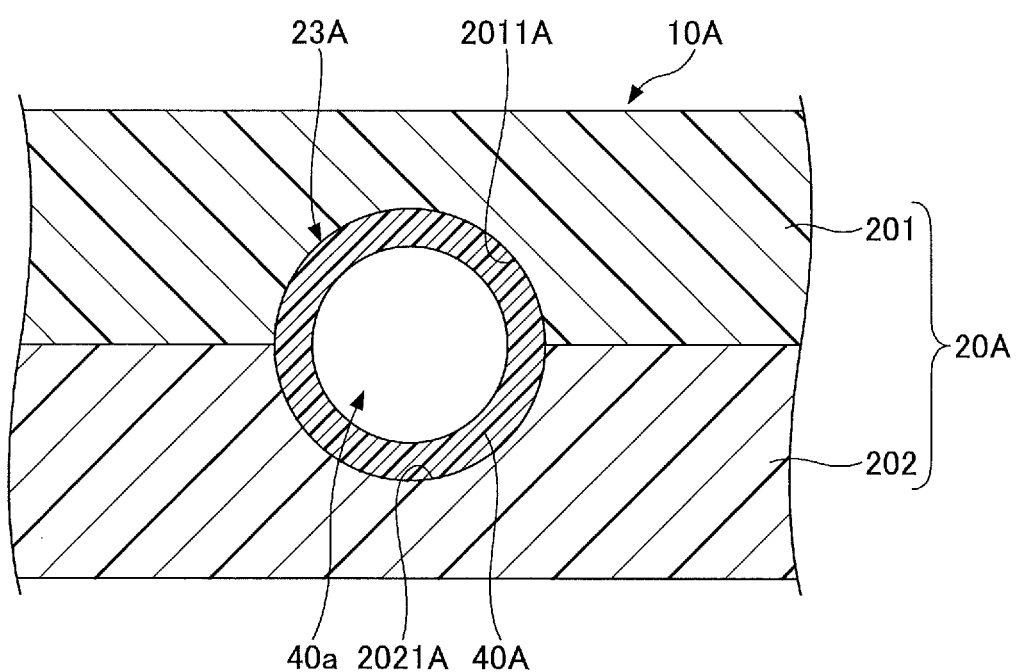
FIG. 15 is a partial cross-sectional view of an example a flow cell having another shape as viewed in the axial direction.

In the present embodiment, the through hole 40a may cross the bonding surfaces of the first plate 201 and the second plate 202. In this case, the internal part 40A may be formed in a polygonal shape, such as a square shape or a pentagonal shape, or in a circular shape as illustrated in FIG. 15 as viewed in the axial direction. Note that the circular shape includes an elliptical shape.

For example, as illustrated in FIG. 15, it is assumed that the flow cell 23A and the internal part 40A are formed in circular shapes as viewed in the axial direction. In this case, the flow cell 23A, formed by the first groove 2011A, which is one of the grooves of the first plate 201, and the second groove 2021A, which is one of the grooves of the second plate 202, is formed in a circular cross-sectional shape as viewed in the axial direction. The internal part 40A is formed in a circular cross-sectional shape that corresponds to the shape of the flow cell 23A as viewed in the axial direction. Because the internal part 40A is formed in a circular cross-sectional shape that corresponds to the shape of the flow cell 23A as viewed in the axial direction, the positional displacement of the internal part 40A in the flow cell 23A can be prevented. Accordingly, the striking of measurement light on the inner wall surface 401 of the internal part 40A due to the positional displacement of the internal part 40A can be reduced when components in a sample are measured.

In the present embodiment, the internal part 40A may be configured to have either the inflow groove 411A or the inflow groove 421A.

In the present embodiment, the internal part 40A may have holes forming the inflow path 41A and the outflow path 42A, instead of the inflow groove 411A that forms the inflow path 41A and the outflow groove 421A that forms the outflow path 42A.

In the present embodiment, the flow path plate 10A may have one or more positioning holes in the corners of the upper surface or the lower surface of the plate body 20A. With this configuration, when the plate body 20A is produced by bonding the first plate 201 and the second plate 202 together, the bonding positions of the first plate 201 and the second plate 202 can be readily adjusted. Further, when the flow path plate 10A is inserted into the analysis apparatus 50A (see FIG. 11), the flow path plate 10A can be readily fixed at a predetermined position of the analysis apparatus 50A. The positioning holes may be formed through the plate body 20A or may be formed in recessed shapes.

In the present embodiment, the inlet 25 and the outlet 26 of the plate body 20A are provided on the +Y side of the flow path plate 10A. However, the inlet 25 and the outlet 26 of the plate body 20A may be provided on one of the other three sides of the flow path plate 10A.

In the present embodiment, any one of the four sides of the plate body 20A may be chamfered. In this manner, the insertion direction of the flow path plate 10A into the analysis apparatus 50A (see FIG. 11) can be readily checked.

Figure 16:
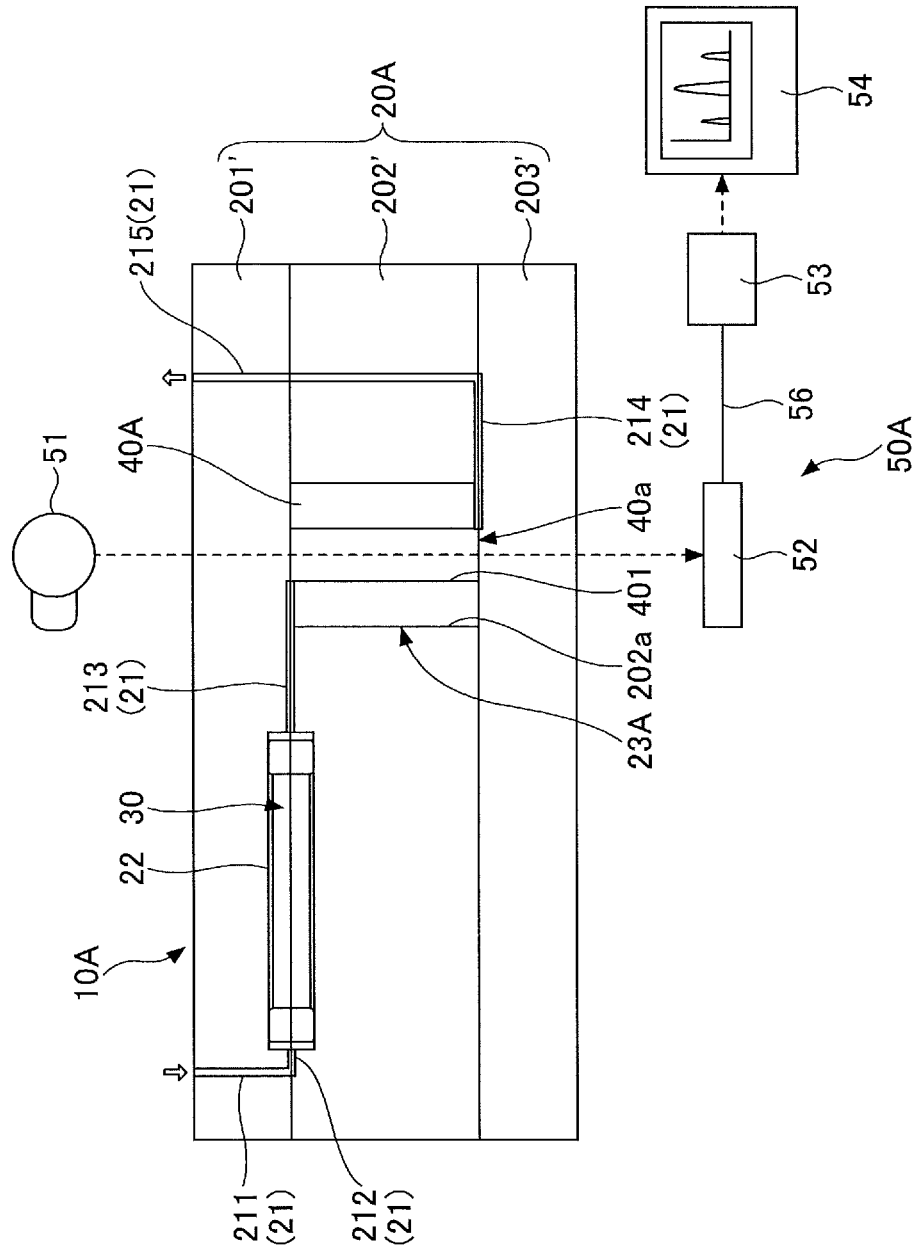
FIG. 16 is a schematic diagram illustrating an example of the analysis apparatus that includes a flow path plate having another configuration.

In the present embodiment, the internal part 40A is disposed in the flow cell (chamber) 23A such that the axial direction of the through hole 40a is parallel to one of the main surfaces of the plate body 20A; however, the present invention is not limited thereto. FIG. 16 a schematic diagram illustrating an example of the analysis apparatus that includes a flow path plate 10A having another configuration according to a modification. In order to facilitate understanding of the description, FIG. 16 depicts a cross-sectional side view of a part of the flow path plate according to the modification. As illustrated in FIG. 16, a flow cell 23A may be formed such that the flow direction of a sample in the flow cell 23A is perpendicular to the one main surface of a plate body 20A. That is, in the flow path plate 10A illustrated in FIG. 16, the flow cell (chamber) 23A is disposed such that the axial direction of a through hole 40a of an internal part 40A is perpendicular to the one of the main surfaces of the plate body 20A. Accordingly, in the flow path plate 10A illustrated in FIG. 16, the flow direction of the sample can be set to the thickness direction (Z direction) of the flow path plate 10A. For example, if the optical path of the analysis apparatus is in the vertical direction, the flow direction of the sample can be set to the vertical direction.

In the flow path plate 10A illustrated in FIG. 16, the plate body 20A is configured by three plates (a first plate 201', a second plate 202', and a third plate 203'). The first plate 201', the second plate 202', and the third plate 203' have grooves or holes corresponding to a liquid flow path (a first liquid flow path 211 through a fifth liquid flow path 215). Further, the second plate 202' has a through hole 202a corresponding to the flow cell (chamber) 23A, and the internal part 40A is disposed in the through hole 202a. A separation element chamber 22 is formed by the first plate 201' and the second plate 202' and a separation column 30 is placed in the separation element chamber 22.

In the flow path plate 10A illustrated in FIG. 16, the second plate 202' may be configured by two second plates. In this case, the separation element chamber 22 may be formed between surfaces of the two second plates that face each other, and the separation column 30 may be placed in the separation element chamber 22. Further, grooves corresponding to the liquid flow path 21 may be formed in surfaces of the two second plates opposite to the surfaces that face each other. In this case, the liquid flow path 21 can be formed by the grooves of the liquid flow path 21 without forming grooves in the first plate 201' and the third plate 203'.

Further, in the flow path plate 10A illustrated in FIG. 16, a hole may be formed in the third plate 203'. In this case, the hole in the third plate 203' can serve as the fifth liquid flow path 215. Accordingly, the sample can be supplied from an inlet on one surface side of the flow path plate, and discharged from an outlet on the other surface side of the flow path plate.

Figure 17:
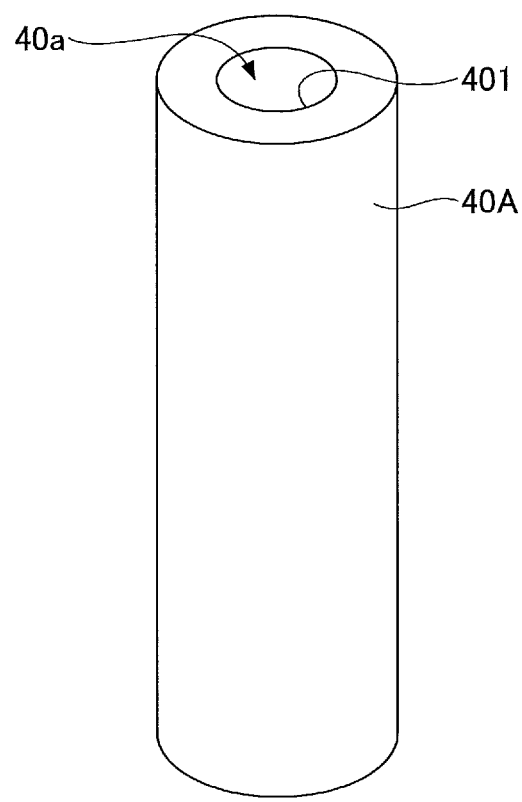
FIG. 17 is a perspective view illustrating another example configuration of the internal part.
Figure 18:
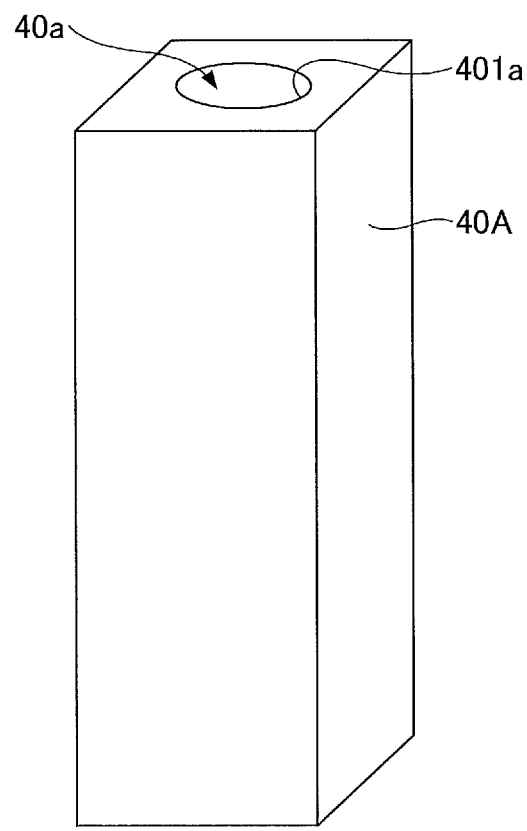
FIG. 18 is a perspective view illustrating another example configuration of the internal part.

Further, in the flow path plate 10A illustrated in FIG. 16, the shape of the internal part 40A as viewed in the axial direction may be a circular shape as illustrated in FIG. 17, may be a square shape as illustrated in FIG. 18, or may be a polygonal shape such as a pentagonal shape. The positional displacement of the internal part 40A in the flow cell 23A can be prevented by changing the shape of the internal part 40A as viewed in the axial direction to a shape (such as a circular shape, a polygonal shape, or the like) that corresponds to the shape of the flow cell 23A. Accordingly, the striking of measurement light on the inner wall surface 401 of the internal part 40A due to the positional displacement of the internal part 40A can be reduced when components in the sample are measured. As a result, the amount of the measurement light passing through the through hole 40a along the optical axis can be increased, thereby allowing the components in the sample to be stably measured.

The flow path plate 10A illustrated in FIG. 16 is obtained by placing the internal part 40A into the through hole 202a of the second plate 202', placing the separation column 30 on the second plate 202', and then sandwiching the second plate 202' between the first plate 201' and the third plate 203'. Thereafter, the first plate 201' and the second plate 202 are bonded together, and the second plate 202' and the third plate 203' are bonded together. In this manner, the flow path plate 10A illustrated in FIG. 16 is obtained.

Further, in the flow path plate 10A illustrated in FIG. 16, the first plate 201' and the third plate 203' may have grooves at positions corresponding to the flow cell 23A. Accordingly, the flow cell 23A is formed by the groove of the first plate 201', the through hole 202a of the second plate 202', and the groove of the third plate 203'. In this case, an internal part that has a shape corresponding to the shape of the above flow cell 23A, that is, an internal part 40A that extends in the axial direction is placed in the flow cell 23A.

In the above-described configuration, after the internal part 40A is placed in the groove of the first plate 201', the second plate 202' is stacked on the first plate 201' such that the internal part 40A is placed in the through hole 202a of the second plate 202'. Then, the third plate 203' is stacked on the second plate 202' such that the internal part 40A is placed in the groove of the third plate 203'. In this manner, the flow path plate 10A having the above-described configuration is assembled. Accordingly, the first plate 201', the second plate 202', and the third plate 203' can be accurately positioned when the flow path plate 10A having the above-described configuration is assembled.

In the flow path plate 10A illustrated in FIG. 16, an inflow path is preferably formed by a through hole that is formed through a portion on one end face side of the internal part 40A and is connected to one end portion of the through hole 40a. In addition, an outflow path is preferably formed by a through hole that is formed through a portion on the other end face side of the internal part 40A and is connected to the other end portion of the through hole 40a.

In the flow path plate 10A illustrated in FIG. 16, measurement is performed by emitting measurement light from the main surface side of the first plate 201' as illustrated in FIG. 16. At this time, after the measurement light is transmitted through the first plate 201', the measurement light passes through the through hole 40a of the internal part 40A within the second plate 202', is transmitted through the third plate 203', and is received by the light receiver 52. The light emitter 51 and the light receiver 52 are disposed facing each other via the flow cell 23A such that the optical axes of the light emitter 51 and the light receiver 52, along which the measurement light passes, lie approximately on the same straight line. With the above configuration, the sample that has passed through the through hole 40a of the internal part 40A of the flow path plate 10A is analyzed based on the results of the measurement light detected by the light receiver 52.

Second Embodiment

A flow path plate 10B according to a second embodiment will be described. The flow path plate 10B according to the second embodiment differs from the flow path plate 10A according to the first embodiment, in that the flow path plate 10B includes an antireflection part that is disposed on the inner wall surface 401 of the internal part 40A and configured to reduce the reflection of measurement light.

Figure 19:
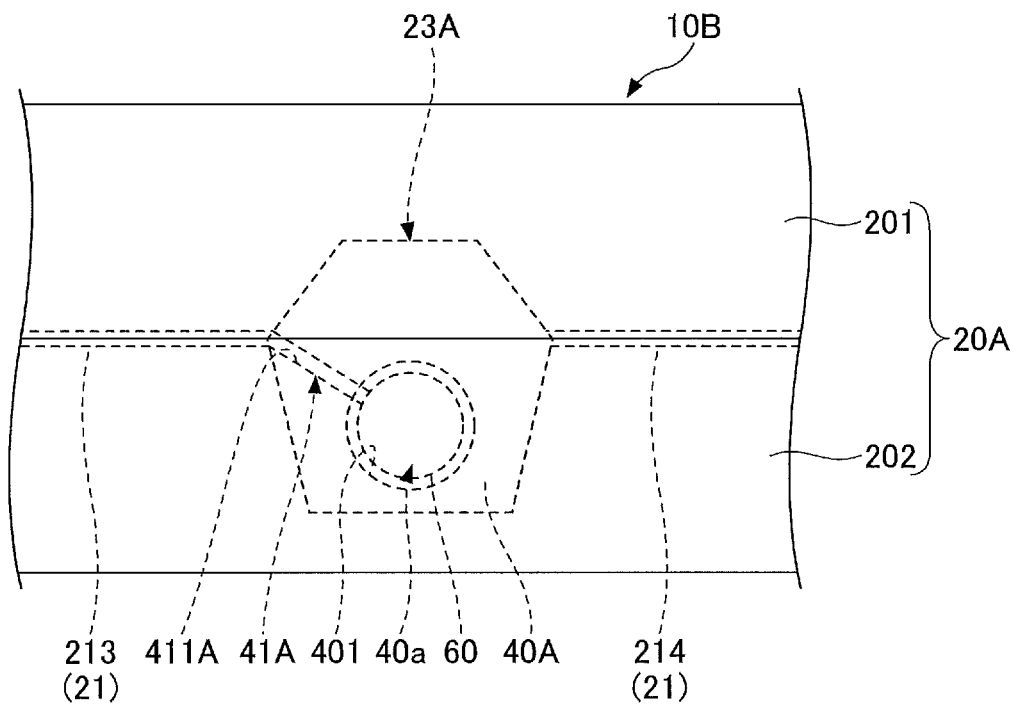
FIG. 19 is an enlarged view of an example configuration of the internal part as viewed from the front of a flow path plate according to a second embodiment.

FIG. 19 is an enlarged view of an example configuration of the internal part 40A as viewed from the front of the flow path plate according to the second embodiment. As illustrated in FIG. 19, the flow path plate 10B according to the second embodiment includes an antireflection film (AR film) 60, which is an example of the antireflection part, disposed on the inner wall surface 401 of the internal part 40A and configured to reduce the reflection of light.

Examples of the material of the AR film 60 include a material including, as a main component, any of Si, Na, Al, Ca, Mg, B, C, Ca, Ti, V, Cr, Mn, Fe, Co, Ni, Cu, Zn, Ga, Sr, Zr, Nb, Ru, Pd, Ag, In, Sn, Hf, Ta, W, Ot, Au, and Bi, or a material including at least one of a nitride, an oxide, a carbide, and a fluoride of the above main component. Specifically, $MgF$, $Si_3N_4$, $SiO_2$, or the like may be used as the material of the AR film 60. Note that antireflective properties can be improved with a small refractive index difference between the AR film 60 and the internal part 40A.

Examples of a method for forming the AR film 60 in the through hole 40a of the internal part 40A include deposition, sputtering, spraying, coating, and a sol-gel method.

In the present embodiment, the thickness of the AR film 60 is designed to have high transmittance for the measurement light, and the optical thickness of the AR film 60 is $\lambda/4$ of the wavelength $\lambda$ of the measurement light.

Preferably, variations in the thickness of the AR film 60 on the inner wall surface of the through hole 40a are small. If variations in the thickness of the AR film 60 are small, partial reflection of the measurement light incident on the AR film 60 can be further reduced. As a result, any scattering of the measurement light when passing through the through hole 40a can be suppressed. Accordingly, the amount of scattered light decreases, thus allowing a large amount of light, having passed through the through hole 40a, to be detected.

As described, the flow path plate 10B includes the AR film 60 on the inner wall surface 401 of the through hole 40a of the internal part 40A. Thus, the measurement light incident on the AR film 60 can be inhibited from being partially reflected at the inner wall surface 401. As a result, any scattering of the measurement light when passing through the through hole 40a can be suppressed. Therefore, the flow path plate 10B can reduce the amount of light scattered when passing through the through hole 40a. Thus, a large amount of light that has passed through the through hole 40a along the optical axes of the light emitter 51 (see FIG. 11) and the light receiver 52 (see FIG. 11) can be detected. Accordingly, the flow path plate 10B can further reduce variations in the intensity of the measurement light, thereby enabling high-accuracy measurement of components in a sample.

(Modifications)

In the present embodiment, the AR film 60 is composed of a single layer, but may be composed of multiple layers.

Figure 20:
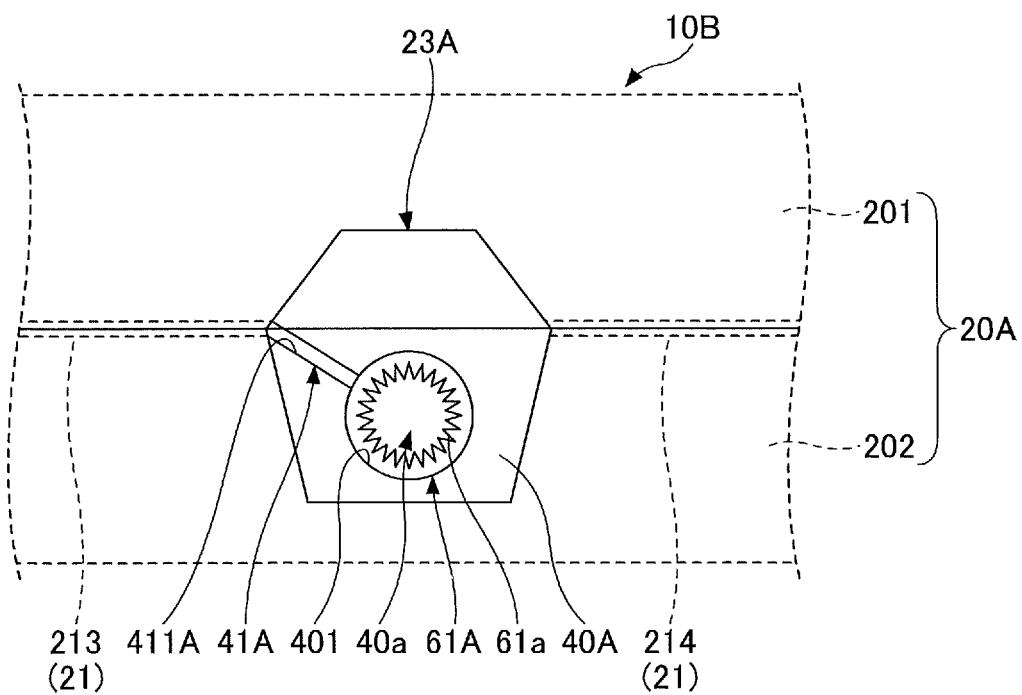
FIG. 20 is a front view of the internal part having a microstructure as viewed in the axial direction.

In the present embodiment, instead of the AR film 60, a microstructure having a plurality of protrusions may be used. FIG. 20 is a diagram illustrating the internal part 40A having a microstructure as viewed in the axial direction. As illustrated in FIG. 20, a microstructure 61A is an uneven microstructure in which a plurality of micro-protrusions 61a are formed. In order to facilitate the understanding of the description, the microstructure 61A is schematically depicted in FIG. 20 through FIG. 22, and the sizes of the microstructure 61A depicted in FIG. 20 through FIG. 22 significantly differs from the actual size.

Figure 21:
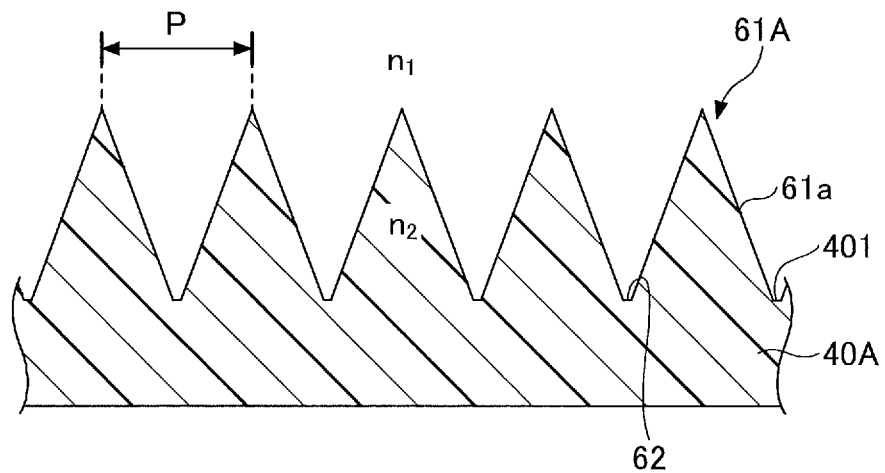
FIG. 21 is a partially enlarged view of the microstructure in the through hole.
Figure 22:
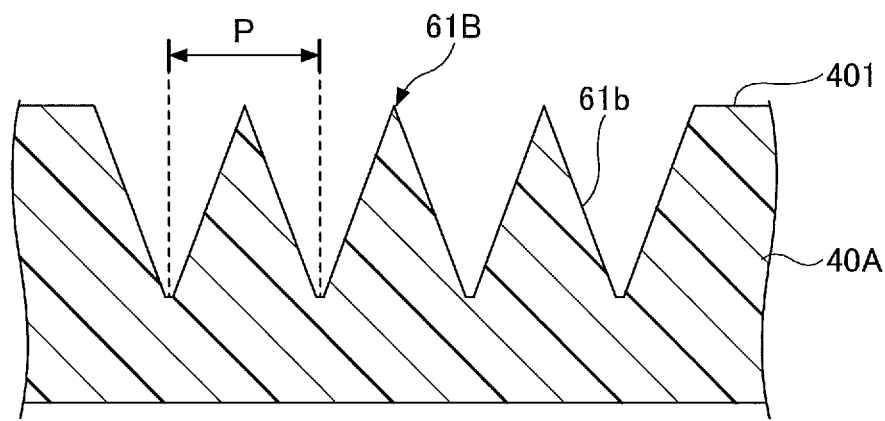
FIG. 22 is an enlarged cross-sectional view of another example of a microstructure.

FIG. 21 is a partially enlarged view of the microstructure 61A in the through hole 40a. As illustrated in FIG. 21, each of the protrusions 61a has a cone shape (tapered shape) whose cross-sectional area gradually decreases radially inward from the inner wall surface 401 toward the inside of the through hole 40a. Accordingly, changes in the refractive index at the interface between the AR film 60 and the through hole 40a can be reduced, and thus the reflection of the measurement light at the interface can be suppressed.

The plurality of micro-protrusions 61a are preferably arranged with a pitch P (the distance between apexes) that is smaller than the wavelength of the measurement light. The pitch P is defined as the distance between the apexes of two adjacent micro-protrusions 61a; however, the pitch P may be the distance between the centers of the bottom surfaces of two adjacent micro-protrusions 61a.

The diameter of each of the micro-protrusions 61a and the pitch P between two adjacent micro-protrusions 61a are preferably smaller than the wavelength of the measurement light in order to decrease the reflectance of the measurement light. The diameter of each of the micro-protrusions 61a is preferably less than or equal to half the wavelength of the measurement light. By setting the diameter of each of the micro-protrusions 61a to be less than or equal to half the wavelength of the measurement light, the reflectance of the measurement light can be sufficiently decreased. Similarly, the pitch P between two adjacent micro-protrusions 61a of the plurality of micro-protrusions 61a is preferably less than or equal to half the wavelength of the measurement light. By setting the distance (pitch P) between two adjacent micro-protrusions 61a of the plurality of micro-protrusions 61a to be less than or equal to half the wavelength of the measurement light, the reflectance of the measurement light can be sufficiently decreased.

A flat portion 62 is formed on the inner wall surface 401 of the through hole 40a and between two adjacent micro-protrusions 61a. Note that the flat portion 62 is not necessarily formed.

The microstructure 61A can be formed on the inner wall surface 401 by etching and electron beam lithography, X-ray lithography, or photolithography, for example.

The through hole 40a of the internal part 40A has the microstructure 61A in which the plurality of micro-protrusions 61a are formed at intervals shorter than the wavelength of the measurement light. In addition, each of the micro-protrusions 61a has a tapered shape whose cross section (cross-sectional area) gradually decreases radially inward from the inner wall surface 401. Accordingly, the refractive index n at the interface between the AR film 60 and the through hole 40a can be gradually changed (from $n_2$ to $n_1$) as illustrated in FIG. 21. That is, the refractive index n can be continually changed. Accordingly, the reflectance of the measurement light at the interface can be reduced. Further, when the length in the extending direction of each of the micro-protrusions 61a is greater than the maximum diameter of a light beam, the refractive index can be gradually changed, and the reflectance can be thus decreased.

In the flow path plate 10B having the microstructure 61A on the inner wall surface 401 of the through hole 40a of the internal part 40A, the measurement light incident on the inner wall surface 401 can be inhibited from being partially reflected at the inner wall surface 401. As a result, any scattering of the measurement light when passing through the through hole 40a can be suppressed.

In the flow path plate 10B having the microstructure 61A, impurities in a sample flowing through the through hole 40a do not readily enter between the micro-protrusions 61a. Thus, the adhesion of the impurities to the micro-protrusions 61a can be decreased. In other words, the adhesion of the impurities to the microstructure 61A can be decreased.

In the flow path plate 10B, the microstructure 61A is preferably formed such that the distances between the centers of the micro-protrusions 61a are approximately constant. Accordingly, the microstructure 61A can reduce reflectance of the measurement light in the entire area where the micro-protrusions 61a are formed.

Note that the shapes, sizes, and arrangement of the micro-protrusions 61a are not particularly limited, as long as adjacent micro-protrusions 61a are arranged at an interval (distance between apexes) shorter than the wavelength of the measurement light.

Each of the micro-protrusions 61a does not necessarily have a cone shape, and may have a tapered shape such as an elliptical cone shape, a polygonal pyramid shape other than a square pyramid shape, a circular truncated cone shape, an elliptical truncated cone shape, or a truncated pyramid shape. Alternatively, each of the micro-protrusions 61a may have a circular columnar shape, an elliptical columnar shape, or a polygonal columnar shape. Further, the shape in the axial direction of each of the micro-protrusions 61a (that is, the shape of the cross section of each of the micro-protrusions 61a parallel to the radial direction of the inner wall surface 401) may be curved.

Each of the micro-protrusions 61a does not necessarily have a tapered shape whose cross section gradually decreases radially from the inner wall surface 401, and may have a shape whose cross section decreases stepwise radially from the inner wall surface 401.

The plurality of micro-protrusions 61a do not necessarily have the same shape and size, and may have different shapes and sizes.

In the present embodiment, the microstructure 61A has the plurality of micro-protrusions 61a that are regularly arranged. However, the micro-protrusions 61a are not necessarily regularly arranged as long as the plurality of micro-protrusions 61a are arranged at intervals shorter than the wavelength of light.

Instead of the microstructure 61A illustrated in FIG. 20 and FIG. 21, a microstructure 61B having a plurality of recesses may be used as illustrated in FIG. 22. The microstructure 61B is an uneven microstructure having micro-recesses 61b on the inner wall surface of the through hole 40a. The micro-recesses 61b can be obtained by etching the inner wall surface of the through hole 40a at a plurality of locations. The microstructure 61B can exhibit effects similar to those of the microstructure 61A.

Further, both the microstructure 61A illustrated in FIG. 20 and FIG. 21 and the microstructure 61B illustrated in FIG. 22 may be formed on the inner wall surface 401 of the through hole 40a of the internal part 40A.

In the present embodiment, the flow path plate 10B may include one or both of the microstructure 61A illustrated in FIG. 20 and FIG. 21 and the microstructure 61B illustrated in FIG. 22 on the inner wall surface 401 of the through hole 40a of the internal part 40A, in addition to the AR film 60 (antireflection part).

Third Embodiment

A flow path plate 100 according to a third embodiment will be described. The flow path plate 100 according to the third embodiment differs from the flow path plate 10A according to the first embodiment, in that the flow direction of a liquid sample (sample) in a flow cell 23B is perpendicular to one main surface of a plate body 20B. The flow cell 23B according to the third embodiment has a shape formed by two truncated quadrangular pyramids joined at the bases, and an internal part for detection 40B (internal part 40B) has a shape corresponding to the shape of the flow cell 23B. Further, the internal part 40B has an inflow path 41B, an outflow path 42B, a first connection flow path 43, and a second connection flow path 44.

Figure 23:
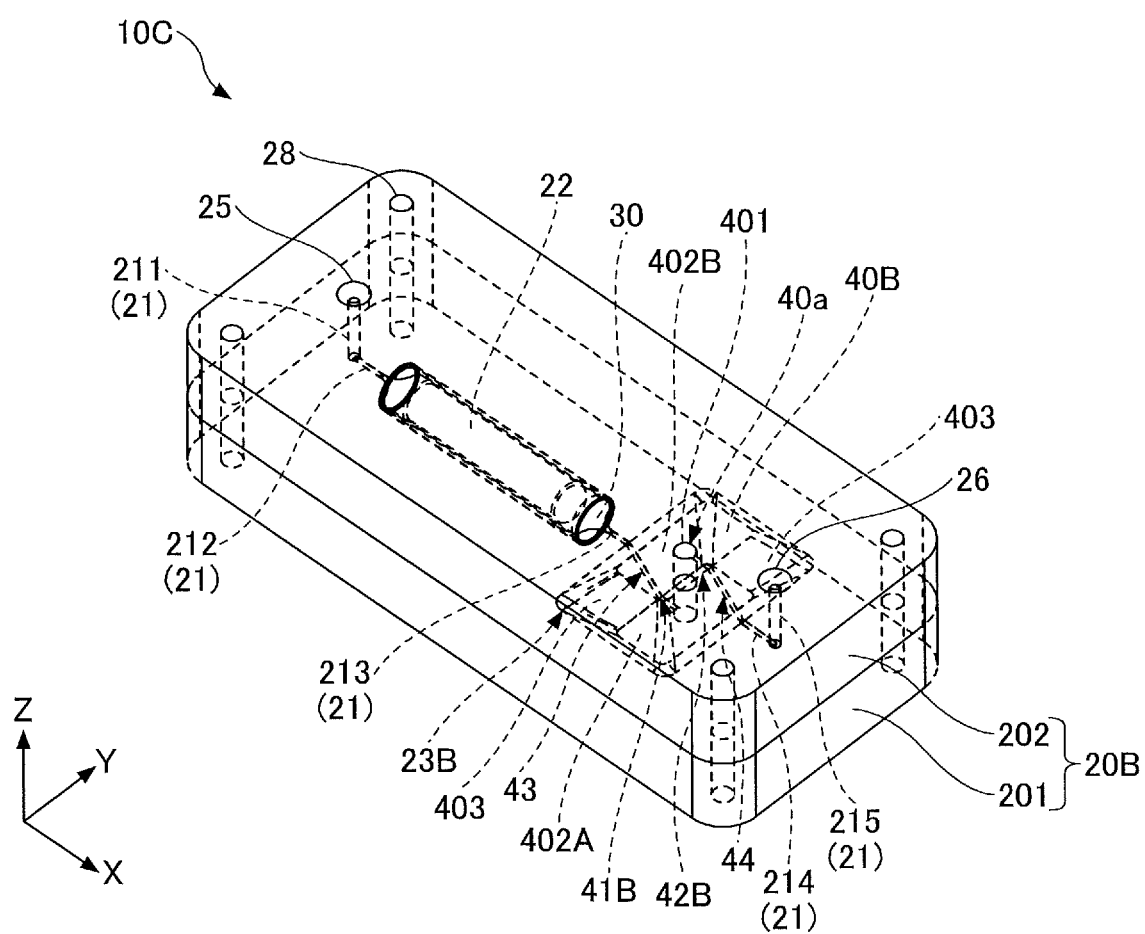
FIG. 23 is a perspective view of an example configuration of a flow path plate according to a third embodiment.
Figure 24:
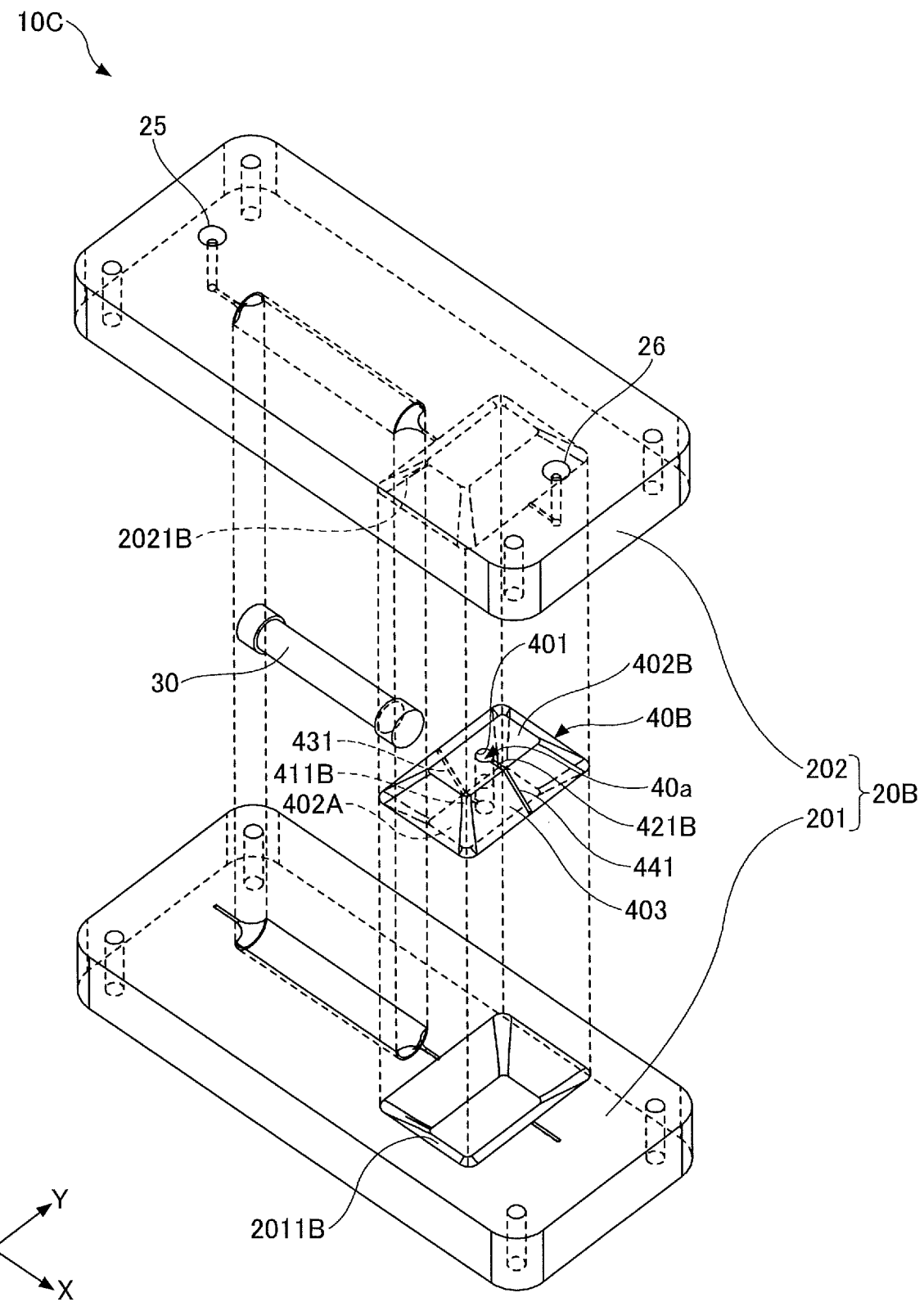
FIG. 24 is an exploded perspective view of the flow path plate.
Figure 25:
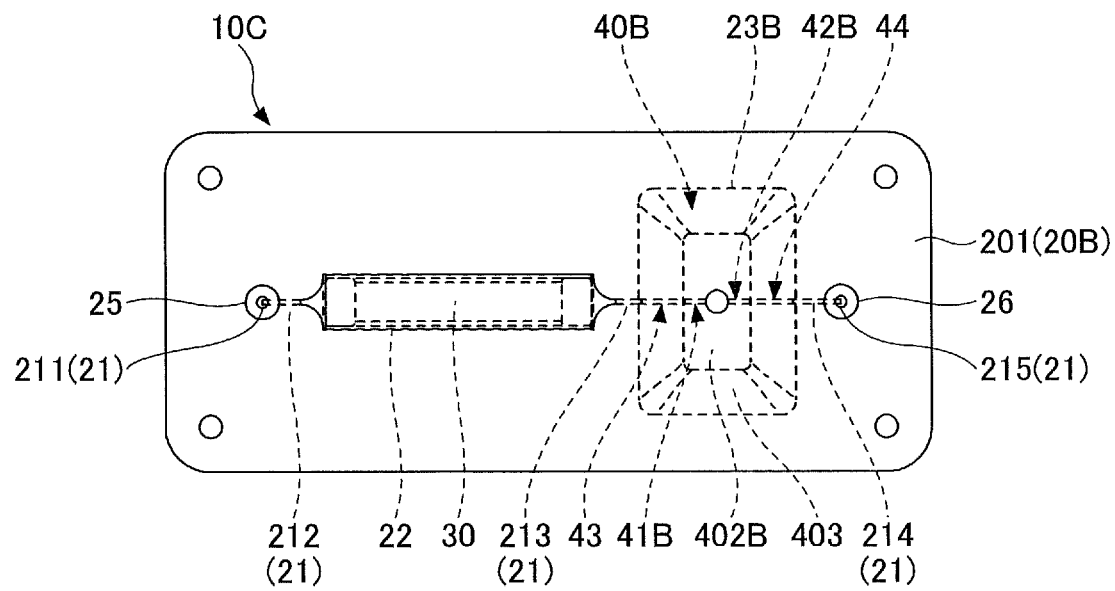
FIG. 25 is a plan view of the flow path plate.
Figure 26:
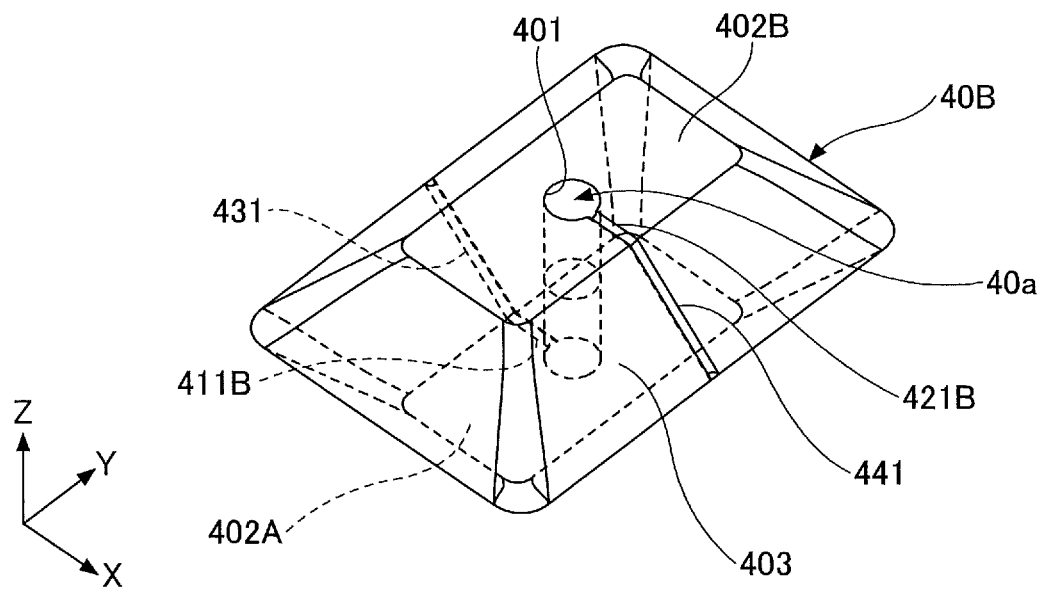
FIG. 26 is a top perspective view of an internal part.
Figure 27:
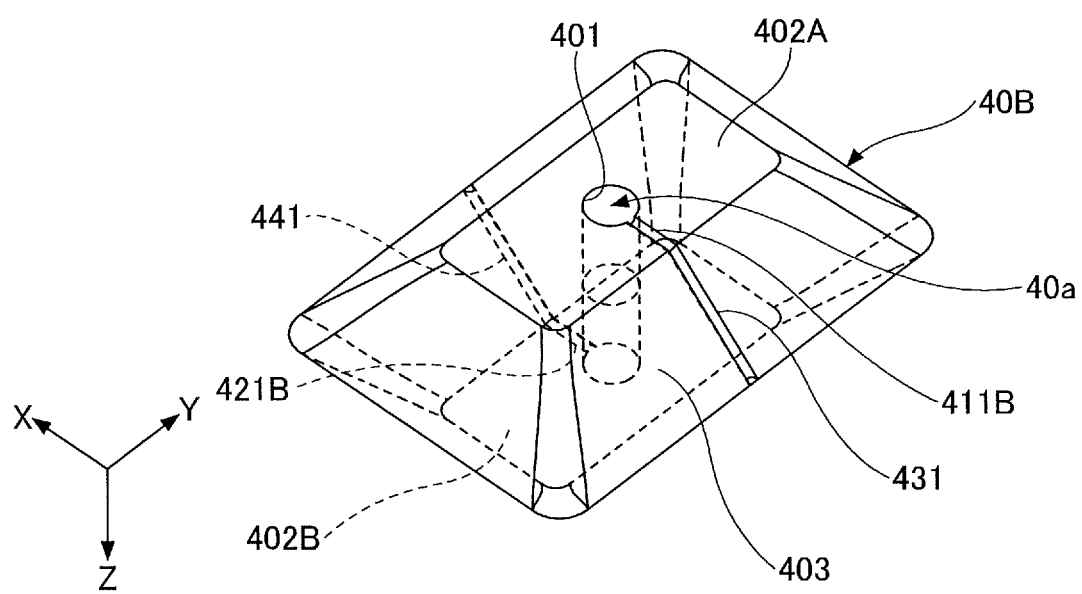
FIG. 27 is a bottom perspective view of the internal part.

FIG. 23 is a perspective view of an example configuration of the flow path plate 10C according to the third embodiment. FIG. 24 is an exploded perspective view of the flow path plate 10C. FIG. 25 is a plan view of the flow path plate 10C. FIG. 26 is a top perspective view of the internal part 40B. FIG. 27 is a bottom perspective view of the internal part 40B. As illustrated in FIG. 23 and FIG. 24, the flow path plate 10C according to the third embodiment includes the plate body 20B having a plate shape, a separation column (separation element) 30 configured to separate components in a sample, and the internal part 40B. The flow path plate 10C includes a flow path through which the sample passes, and the separation column 30 and the internal part 40B are provided in respective parts of the flow path. In the following, the plate body 20B, the flow cell 23B, and the internal part 40B, having configurations different from those of the flow path plate 10A of the first embodiment, will be mainly described.

As illustrated in FIG. 23, the plate body 20B of the flow path plate 10C has a plate shape, similar to the first embodiment. In plan view, the plate body 20B has a rectangular shape (see FIG. 23), and the corners of the plate body 20B are rounded. Further, the plate body 20B includes two plates (a first plate 201 and a second plate 202), and the first plate 201 is stacked on the second plate 202 in the thickness direction of the plate body 20B.

The plate body 20B has the flow path through which the liquid sample flows. The flow path includes a liquid flow path 21 (a first liquid flow path 211, a second liquid flow path 212, a third liquid flow path 213, a fourth liquid flow path 214, and a fifth liquid flow path 215), a separation element chamber 22, and the flow cell (chamber) 23B. Further, grooves or holes, having shapes corresponding to the shapes of the liquid flow path 21, the separation element chamber 22, and the flow cell 23B, are formed in the first plate 201 and the second plate 202.

In the flow path plate 10C, the flow path extends from the inlet 25, through the first liquid flow path 211, which extends substantially vertically in the thickness direction (−Z direction) of the flow path plate 10B, to the second liquid flow path 212 that extends in the +X direction. Then, the flow path further extends from the second liquid flow path 212, through the separation element chamber 22 and the third liquid flow path 213 that extend in the +X direction, to the flow cell 23B. Then, the direction of the flow path is changed to the thickness direction (+Z direction) of the flow path plate 10B by the internal part 40B disposed in the flow cell 23B. Then, the flow path further extends from the flow cell 23B, through the fourth liquid flow path 214 that extends in the +X direction and the fifth liquid flow path 215 that extends substantially vertically in the thickness direction (+Z direction) of the flow path plate 10C, to the outlet 26.

The second liquid flow path 212, the separation element chamber 22, the third liquid flow path 213, and the fourth liquid flow path 214 extend in +X direction of the flow path plate 10C along the boundary portion of the first plate 201 and the second plate 202.

As illustrated in FIG. 23 through FIG. 25, the flow path plate 10C has four positioning holes 28 in the corners of the upper surface and the lower surface of the plate body 20B. With this configuration, when the plate body 20B is produced by bonding the first plate 201 and the second plate 202 together, the bonding positions of the first plate 201 and the second plate 202 can be readily adjusted. In addition, when the flow path plate 10C is inserted into an analysis apparatus 50B (see FIG. 28), the flow path plate 10C can be readily positioned with respect to the analysis apparatus 50B while allowing the flow path plate 10C to be precisely fixed. Accordingly, the accuracy of the relative positions of the light emitter 51, the through hole 40a of the internal part 40B, and the light receiver 52 can be improved, and measurement accuracy can be thus improved. Note that each of the positioning holes 28 may be formed through the plate body 20B or may be formed in a recessed shape.

As illustrated in FIG. 23 and FIG. 24, the flow cell 23B is formed by a first groove 2011B of the first plate 201 and a second groove 2021B of the second plate 202. The flow cell 23B is formed by a space having a cross-sectional area greater than cross-sectional areas of other parts (such as the third liquid flow path 213 and the fourth liquid flow path 214) of the flow path through which the sample passes. Further, each of the first groove 2011B and the second groove 2021B, forming the flow cell 23B, has a shape of a truncated quadrangular pyramid whose base face at the top has an opening. When the first plate 201 and the second plate 202 are bonded together, the flow cell 23B is vertically and horizontally symmetrical (mirror-image relationship). More specifically, the flow cell 23B is vertically symmetrical with respect to the bonding surfaces of the first plate 201 and the second plate 202.

As illustrated in FIG. 26 and FIG. 27, the internal part 40B has a shape formed by two truncated quadrangular pyramids joined at the bases. That is, the internal part 40B has flat surfaces 402A and 402B that serve as upper and lower surfaces of the internal part 40B. The internal part 40B has four tapered surfaces 403 that are continuous with the flat surface 402A, and four tapered surfaces 403 that are continuous with the flat surface 402B. That is, the internal part 40B has the flat surfaces 402A and 402B and the eight tapered surfaces 403.

As illustrated in FIG. 23 through FIG. 27, the internal part 40B has a through hole 40a through center portions of the flat surface 402A and the flat surface 402B. The through hole 40a extends from the flat surface 402A (on the −Z side) to the flat surface 402B (on the +Z side) of the internal part 40B. Note that the center portions are located at the intersection of diagonal lines of the internal part 40B in plan view (see FIG. 25).

As illustrated in FIG. 26 and FIG. 27, an inflow groove 411B, connected to one end of the through hole 40a, is formed in the flat surface 402A of the internal part 40B, and an outflow groove 421B, connected to the other end of the through hole 40a, is formed in the flat surface 402B of the internal part 40B. By the internal part 40B being placed in the flow cell 23B, the inflow path 41B is formed by the bottom wall of the first groove 2011B of the flow cell 23B and the inflow groove 411B of the internal part 40B. In addition, the outflow path 42B is formed by the bottom wall of the second groove 2021B of the flow cell 23B and the outflow groove 421B of the internal part 40B.

With the above configuration, a sample flowing from the liquid flow path 21 can enter the through hole 40a through the inflow groove 411B (inflow path 41B) of the internal part 40B along the inner wall surface 401. In addition, the sample can flow into the liquid flow path 21 from the through hole 40a through the outflow groove 421B (outflow path 42B) along the inner wall surface 401. That is, as viewed from the irradiation side of measurement light, the liquid flow path 21 of the plate body 20B is not present at the both ends of the through hole 40a. Accordingly, the flow path plate 10B can prevent the liquid flow path 21 from blocking the path of the measurement light emitted into the internal part 40B.

As illustrated in FIG. 26 and FIG. 27, tapered surfaces 403 have a first connection groove 431, connected to the third liquid flow path 213, and a second connection groove 441, connected to the fourth liquid flow path 214. In the present embodiment, the first connection groove 431 is formed in one tapered surface 403 of the four tapered surfaces 403 that are continuous with the flat surface 402A. The second connection groove 441 is formed in one tapered surface 403 of the four tapered surfaces 403 that are continuous with the flat surface 402B. By the internal part 40B being placed in the flow cell 23B, the first connection flow path 43, connected to the one end of the through hole 40a through the inflow path 41B, is formed by the side wall of the first groove 2011B of the flow cell 23B and the first connection groove 431 of the internal part 40B. In addition, the second connection flow path 44, connected to the other end of the through hole 40a through the outflow path 42B, is formed by the side wall of the second groove 2021B of the flow cell 23B and the second connection groove 441 of the internal part 40B.

In general, in a typical flow path plate, if a flow cell is formed such that the axial direction of the flow cell is perpendicular to one main surface of a plate body, at least three plates would be required by design. Conversely, in the present embodiment, in addition to the liquid flow path 21 formed by the first plate 201 and the second plate 202, the first connection flow path 43 and the second connection flow path 44 can be separately formed by the internal part 40B and the first and second plates 201 and 202. Accordingly, even when the internal part 40B is disposed within the flow cell 23B such that the axial direction of the through hole 40a of the internal part 40B is perpendicular to one main surface of the plate body 20B, the entire flow path, including the through path 40a that is a part of the flow path, can be formed by the two plates (the first plate 201 and the second plate 202). Accordingly, the plate body 20B of the flow path plate 10C can be configured by the small number of plates and can be readily produced.

As described, in the flow path plate 10C, the flow cell 23B is formed such that the flow direction of the sample is perpendicular to one main surface of the plate body 20B, and the flow cell 23B and the internal part 40B each have a shape formed by two truncated quadrangular pyramids joined at the bases. In addition, the inflow path 41B, the outflow path 42B, the first connection flow path 43, and the second connection flow path 44 are formed in the flat surfaces 402A and 402B and the tapered surfaces 403 of the internal part 40B. Accordingly, in the flow path plate 10C, components in a liquid sample can be measured with high accuracy, and the plate body 20B can be configured by the two first and second plates 201 and 202.

Figure 28:
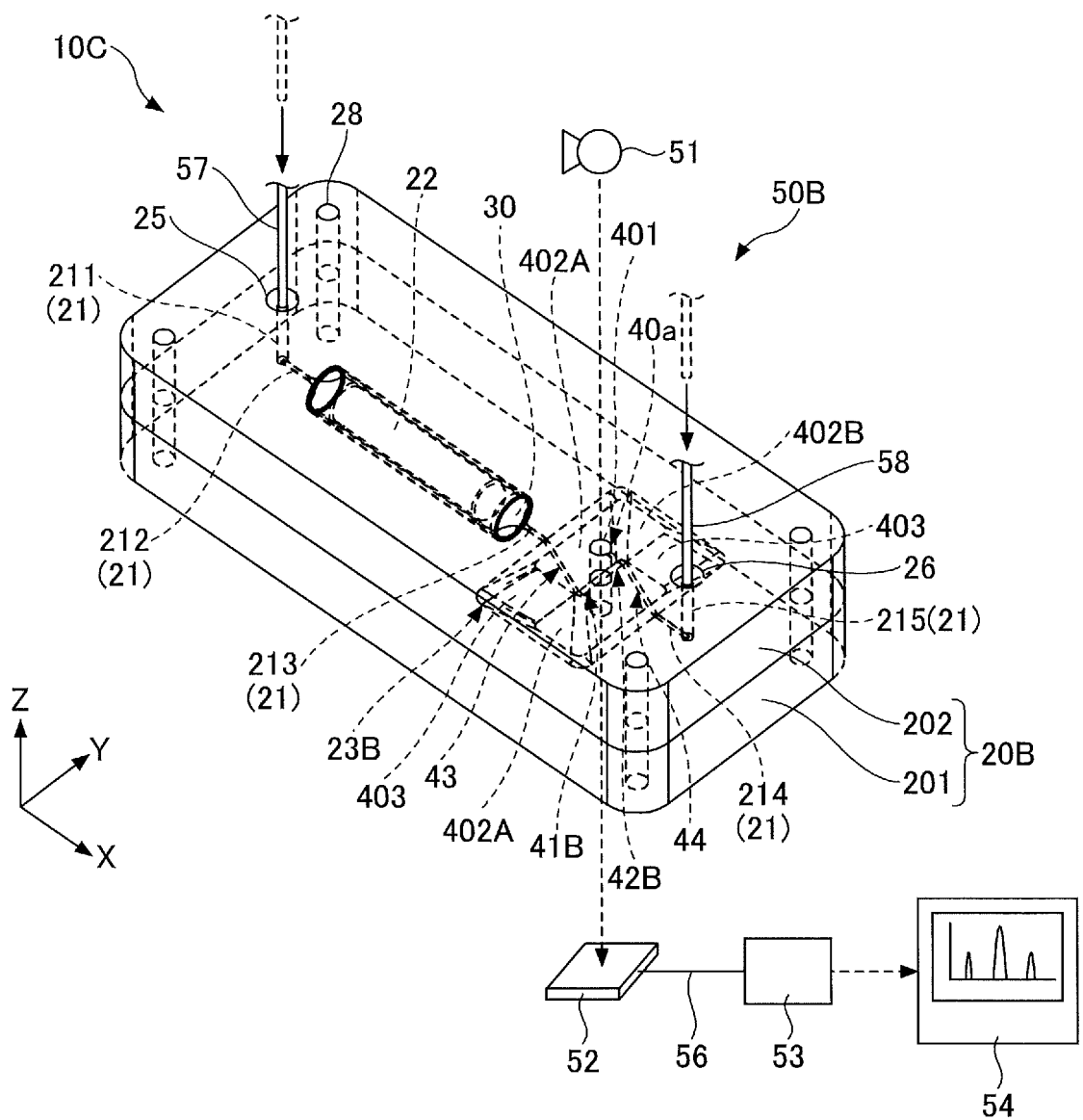
FIG. 28 is a schematic diagram illustrating an analysis apparatus that includes the flow path plate.

An example in which a sample is analyzed by the analysis apparatus 50B that includes the flow path plate 10C according to the present embodiment will be described. FIG. 28 is a schematic diagram illustrating the analysis apparatus 50B that includes the flow path plate 10C. As illustrated in FIG. 28, the analysis apparatus 50B includes the flow path plate 10C, the light emitter 51, the light receiver 52, the controller 53, and the display 54. The light emitter 51, the light receiver 52, the controller 53, and the display 54 of the analysis apparatus 50B are the same as those of the analysis apparatus 50A that includes the flow path plate 10A (FIG. 11) according to the first embodiment, and thus a description thereof will be omitted.

When the flow path plate 100 is inserted into the analysis apparatus 50B, the position of the flow path plate 10B is fixed within the analysis apparatus 50B. Thereafter, the supply tube 57 is automatically inserted into the inlet 25, and a discharge tube 58 is automatically inserted into the outlet 26. The sample is then supplied from the supply tube 57 into the inlet 25.

The sample flows from the inlet 25 to the first liquid flow path 211 in the thickness direction of the flow path plate 100, and then flows into the separation element chamber 22 through the second liquid flow path 212. While the sample is passing through the separation column 30 disposed in the separation element chamber 22, components of the sample are separated within the separation column 30. Thereafter, the sample, whose components are separated, flows from the separation element chamber 22 into the flow cell 23B through the third liquid flow path 213.

When the sample is supplied into the flow cell 23B, the sample flows from the first connection flow path 43 through the inflow path 41B to one end of the through hole 40 of the internal part 40A. After passing through the through hole 40a, the sample flows from the other end of the through hole 40a, through the outflow path 42B and the second connection flow path 44 within the flow cell 23B, to the fourth liquid flow path 214. Then, the sample flows from the fourth liquid flow path 214 through the fifth liquid flow path 215 to the outlet 26, and is discharged from the outlet 26.

While the sample is flowing through the through hole 40a or before the sample flows through the through hole 40a, the light emitter 51 emits measurement light such that the measurement light passes through the through hole 40a. Then, the light emitted from the light emitter 51 passes through the through hole 40a, and is received and detected by the light receiver 52.

The results of the measurement light detected by the light receiver 52 are transmitted to the controller 53 via the wiring 56. Then, the controller 53 analyzes the sample that has passed through the through hole 40a of the internal part 40B disposed in the flow cell 23B. The controller 53 transmits the analysis results to the display 54, and the analysis results are displayed on the display 54.

Accordingly, even when the flow cell 23B is formed such that the flow direction of the sample within the flow cell 23B is perpendicular to one main surface of the plate body 20B, the flow path plate 10C according to the present embodiment can exhibit effects similar to those of the flow path plate 10A according to the first embodiment.

Further, even when the flow cell 23B is formed such that the flow direction of the sample within the flow cell 23B is perpendicular to one main surface of the plate body 20B, the plate body 20B of the flow path plate 10C can be configured by the small number of plates. More specifically, in a typical flow path plate, if an internal part for detection is disposed within a flow cell such that the axial direction of a through hole of the internal part is perpendicular to the main surface of a flow path plate, at least three plates would be required.

Conversely, in the flow path plate 10C according to the present embodiment, the internal part 40B has the first connection groove 431 and the second connection groove 441. That is, in addition to the liquid flow path 21 formed by the first plate 201 and the second plate 202, the first connection flow path 43 and the second connection flow path 44 can be separately formed by the internal part 40B and the first and second plates 201 and 202. In the flow path plate 10C, the internal part 40B is disposed in the flow cell 23B such that the axial direction of the through hole 40a of the internal part 40B is perpendicular to one main surface of the plate body 20B. Similar to the flow path plate 10A according to the first embodiment, in the flow path plate 10C according to the present embodiment, the entire flow path, including the through hole 40a that is a part of the flow path 21, can be formed by the two plates (the first plate 201 and the second plate 202). Therefore, the plate body 20B can be configured by the small number of plates and can also be readily produced. In addition, because the number of plates constituting the plate body 20B can be reduced, manufacturing costs of the flow path plate can be reduced.

In the flow path plate 10C, because the internal part 40B has the inflow path 41B and the outflow path 42B, the sample flowing from the first connection flow path 43 can enter the through hole 40a through the inflow groove 411B (inflow path 41B) of the internal part 40B along the inner wall surface 401. In addition, the sample can flow into the second connection flow path 44 from the through hole 40a through the outflow groove 421B (outflow path 42B) of the internal part 40B along the inner wall surface 401 side. That is, as viewed from the irradiation side of measurement light, the liquid flow path 21 of the plate body 20B is not present at the both ends of the through hole 40a, thereby reducing the generation of noise when the measurement light passes through the through hole 40a. Accordingly, the flow path plate 10C can improve the performance of the light receiver 52 for detecting the measurement light.

In the present embodiment, the flow path plate 10C may have any shape, other than the rectangular shape, such as a circular shape.

In the present embodiment, each of the flow cell 23B and the internal part 40B has a shape formed by two truncated quadrangular pyramids joined at the bases; however, each of the flow cell 23B and the internal part 40B may be formed in any shape as long as the inflow path 41B and the outflow path 42B can be formed in the tapered surfaces 403 of the internal part 40B.

Although the embodiments of the present invention have been described in detail above, the present invention is not limited to the particulars of the above-described embodiments. The embodiments may be implemented in various other forms, and various combinations, omissions, substitutions, and modifications may be made without departing from the scope of the present invention. The embodiments and variations thereof are included in the scope and gist of the present invention and are included in the scope of the present invention described in the claims and equivalents thereto.

What is claimed is:

1. A flow path plate for analysis of a component in a liquid sample, flowing within the flow path plate, by irradiating the liquid sample with measurement light, the flow path plate comprising:
   a plate body having a plate shape and having transparency;
   a flow path formed within the plate body and through which the liquid sample passes;
   a chamber provided in a first part of the flow path and formed by a space having a cross-sectional area greater than cross-sectional areas of other parts of the flow path; and
   an internal part for detection disposed in the chamber and having a through hole, the through hole having an inner wall surface and constituting a part of the flow path,
   wherein the measurement light passes through the through hole, and
   wherein the internal part is configured to inhibit transmission of the measurement light from the inner wall surface of the through hole to outside.

2. The flow path plate according to claim 1, wherein the internal part includes one or both of an inflow path and an outflow path, the inflow path being connected to one end of the through hole, and the outflow path being connected to another end of the through hole.

3. The flow path plate according to claim 1, wherein the internal part includes one or both of an engineering plastic and a super engineering plastic.

4. The flow path plate according to claim 1, further comprising an antireflection part disposed on the inner wall surface of the through hole and configured to reduce reflection of the measurement light.

5. The flow path plate according to claim 4, wherein the antireflection part includes one or both of an antireflection film and a microstructure, the microstructure having a plurality of protrusions or a plurality of recesses.

6. The flow path plate according to claim 1, wherein the plate body includes at least two plates, each having a plate shape, one being a first plate and another being a second plate,
   wherein one or both of the first plate and the second plate have grooves, and
   wherein the first plate and the second plate are bonded together such that the flow path is formed by the grooves.

7. The flow path plate according to claim 6, wherein the internal part is disposed in the chamber such that an axial direction of the through hole is parallel to or perpendicular to one main surface of the plate body.

8. The flow path plate according to claim 6, wherein each of the first plate and the second has grooves, and the chamber is formed by a first groove of the grooves of the first plate and by a second groove of the grooves of the second plate, and
   wherein the internal part has a polygonal cross-sectional shape or a circular cross-sectional shape as viewed in an axial direction of the through hole.

9. The flow path plate according to claim 8, wherein the internal part has the polygonal cross-sectional shape as viewed in the axial direction of the through hole,
   wherein a cross-sectional shape of the first groove and a cross-sectional shape of the second groove are asymmetrical, and
   wherein the through hole of the internal part disposed in the chamber is located in either the first groove or the second groove.

10. The flow path plate according to claim 6, wherein the internal part includes one or both of a first connection flow path and a second connection flow path, the first connection flow path connecting one end of the through hole to the flow path formed within the plate body, and the second connection flow path connecting another end of the through hole to the flow path formed within the plate body.

11. The flow path plate according to claim 1, further comprising a separation element chamber in a second part on an upstream side of the flow path relative to the first part of the flow path through which the measurement light passes, and wherein a separation element is disposed in the separation element chamber.

12. An analysis apparatus comprising:
    the flow path plate according to claim 1;
    a light emitter configured to emit the measurement light to the internal part in the flow path plate such that the measurement light passes through the through hole; and
    a light receiver configured to receive the measurement light that has passed through the through hole in the flow path plate.

13. An analysis method for analysis of a component in a liquid sample by using a flow path plate that includes
    a plate body having a plate shape and having transparency,
    a flow path formed within the plate body and through which the liquid sample passes,
    a chamber provided in a part of the flow path and formed by a space having a cross-sectional area greater than cross-sectional areas of other parts of the flow path, and
    an internal part for detection disposed in the chamber and having a through hole, the through hole having an inner wall surface and through which the liquid sample and measurement light pass,
    wherein the internal part is configured to inhibit transmission of the measurement light from the inner wall surface of the through hole to outside, the method comprising:
    emitting the measurement light into the through hole of the internal part; and
    analyzing the measurement light that has passed through the liquid sample flowing through the through hole of the internal part.

* * * * *